(12) United States Patent
Jaber et al.

(10) Patent No.: US 11,536,483 B1
(45) Date of Patent: Dec. 27, 2022

(54) MODEL-BASED CONTROL OF ZONE DAMPERS IN AN HVAC SYSTEM

(71) Applicant: Trane International Inc., Davidson, NC (US)

(72) Inventors: Youssef A. Jaber, Tyler, TX (US); Wayne N. Kraft, Tyler, TX (US); Behrooz Karimi, Tyler, TX (US)

(73) Assignee: Trane International Inc., Davidson, NC (US)

( * ) Notice: Subject to any disclaimer, the term of this patent is extended or adjusted under 35 U.S.C. 154(b) by 57 days.

(21) Appl. No.: 17/082,771

(22) Filed: Oct. 28, 2020

(51) Int. Cl.
| | |
|---|---|
| *F24F 11/74* | (2018.01) |
| *F24F 11/64* | (2018.01) |
| *F24F 11/65* | (2018.01) |
| *F24F 11/79* | (2018.01) |
| *F24F 11/89* | (2018.01) |
| *G05B 19/042* | (2006.01) |
| *F24F 120/12* | (2018.01) |
| *F24F 140/40* | (2018.01) |

(Continued)

(52) U.S. Cl.
CPC .............. *F24F 11/74* (2018.01); *F24F 11/64* (2018.01); *F24F 11/65* (2018.01); *F24F 11/79* (2018.01); *F24F 11/89* (2018.01); *G05B 19/042* (2013.01); *F24F 2120/12* (2018.01); *F24F 2140/10* (2018.01); *F24F 2140/40* (2018.01); *F24F 2140/50* (2018.01); *G05B 2219/2614* (2013.01)

(58) Field of Classification Search
CPC .. F24F 11/74; F24F 11/64; F24F 11/65; F24F 11/89; F24F 11/79; F24F 2140/40; F24F 2140/50; F24F 2120/12; F24F 2140/10; F24F 11/0001; F24F 11/30; F24F 3/0442; F24F 3/044; G05B 19/042; G05B 2219/2614

See application file for complete search history.

(56) References Cited

U.S. PATENT DOCUMENTS

| | | | |
|---|---|---|---|
| 6,964,174 B2 | 11/2005 | Shah | |
| 7,017,827 B2 | 3/2006 | Shah et al. | |

(Continued)

OTHER PUBLICATIONS

Chen, Haoran, Cai, W. and Chen, C., 2016. Model-based method for testing, adjusting and balancing of HVAC duct system. Energy and Buildings, 126, pp. 498-507. (Year: 2016).*

(Continued)

*Primary Examiner* — Alicia M. Choi
(74) *Attorney, Agent, or Firm* — Womble Bond Dickinson (US) LLP

(57) ABSTRACT

A method is provided for controlling an HVAC system. The method includes receiving zone airflow target values for zones of a conditioned space. The method includes accessing a duct model including a first term that describes a flow factor for a zone damper as a nonlinear function of damper position, and a second term that describes zone airflow as a function of the flow factor and a branch pressure across zone-specific branches of an air circulation path. The method includes applying the zone airflow target values to the duct model to determine a damper position set, and actuating zone dampers to respective damper positions of the damper position set. The method may also include determining a value of total airflow to achieve the zone airflow target values with a total pressure target, and causing a fan to provide conditioned air with the value of the total airflow.

24 Claims, 16 Drawing Sheets

(51) Int. Cl.
*F24F 140/50* (2018.01)
*F24F 140/10* (2018.01)

(56) References Cited

U.S. PATENT DOCUMENTS

| | | | |
|---|---|---|---|
| 7,036,743 B2 | 5/2006 | Shah | |
| 9,429,923 B2 | 8/2016 | Ward et al. | |
| 9,534,797 B2* | 1/2017 | Tsutsumi | F24F 3/0442 |
| 10,359,202 B1 | 7/2019 | Prather | |
| 2006/0116067 A1* | 6/2006 | Federspiel | F24F 11/0001 |
| | | | 454/256 |
| 2017/0003150 A1* | 1/2017 | Noboa | F25B 13/00 |
| 2018/0306459 A1 | 10/2018 | Turney | |
| 2019/0195527 A1* | 6/2019 | Puranen | F24F 11/62 |
| 2019/0203971 A1* | 7/2019 | Iio | F24F 13/30 |
| 2019/0236446 A1* | 8/2019 | Qin | G06N 3/04 |
| 2019/0354071 A1 | 11/2019 | Turney | |
| 2020/0141604 A1* | 5/2020 | Chen | F24F 11/58 |
| 2020/0217538 A1* | 7/2020 | Karamanos | F24F 11/75 |
| 2020/0232667 A1* | 7/2020 | Karamanos | G05B 17/02 |

OTHER PUBLICATIONS

Jing, G., Cai, W., Zhang, X., Cui, C., Yin, X. and Xian, H., 2019. An energy-saving oriented air balancing strategy for multi-zone demand-controlled ventilation system. Energy, 172, pp. 1053-1065. (Year: 2019).*

Jing, G., Cai, W., Zhang, X., Cui, C., Yin, X. and Xian, H., 2019. Modeling, air balancing and optimal pressure set-point selection for the ventilation system with minimized energy consumption. Applied Energy, 236, pp. 574-589. (Year: 2019).*

Nassif, N., 2014, Jun. Modeling and optimization of HVAC systems using artificial neural network and genetic algorithm. In Building Simulation (vol. 7, No. 3, pp. 237-245). Springer Berlin Heidelberg. (Year: 2014).*

Kumar, R., Aggarwal, R.K. and Sharma, J.D., 2013. Energy analysis of a building using artificial neural network: A review. Energy and Buildings, 65, pp. 352-358. (Year: 2013).*

Islamoglu, Y. and Kurt, A., 2004. Heat transfer analysis using ANNs with experimental data for air flowing in corrugated channels. International Journal of Heat and Mass Transfer, 47(6-7), pp. 1361-1365. (Year: 2004).*

Yang, Z., Ding, L., Xiao, H., Zhang, G., Wang, B. and Shi, W., 2020. All-condition measuring methods for field performance of room air conditioner. Applied Thermal Engineering, 180, pp. 115-887. (Year: 2020).*

* cited by examiner

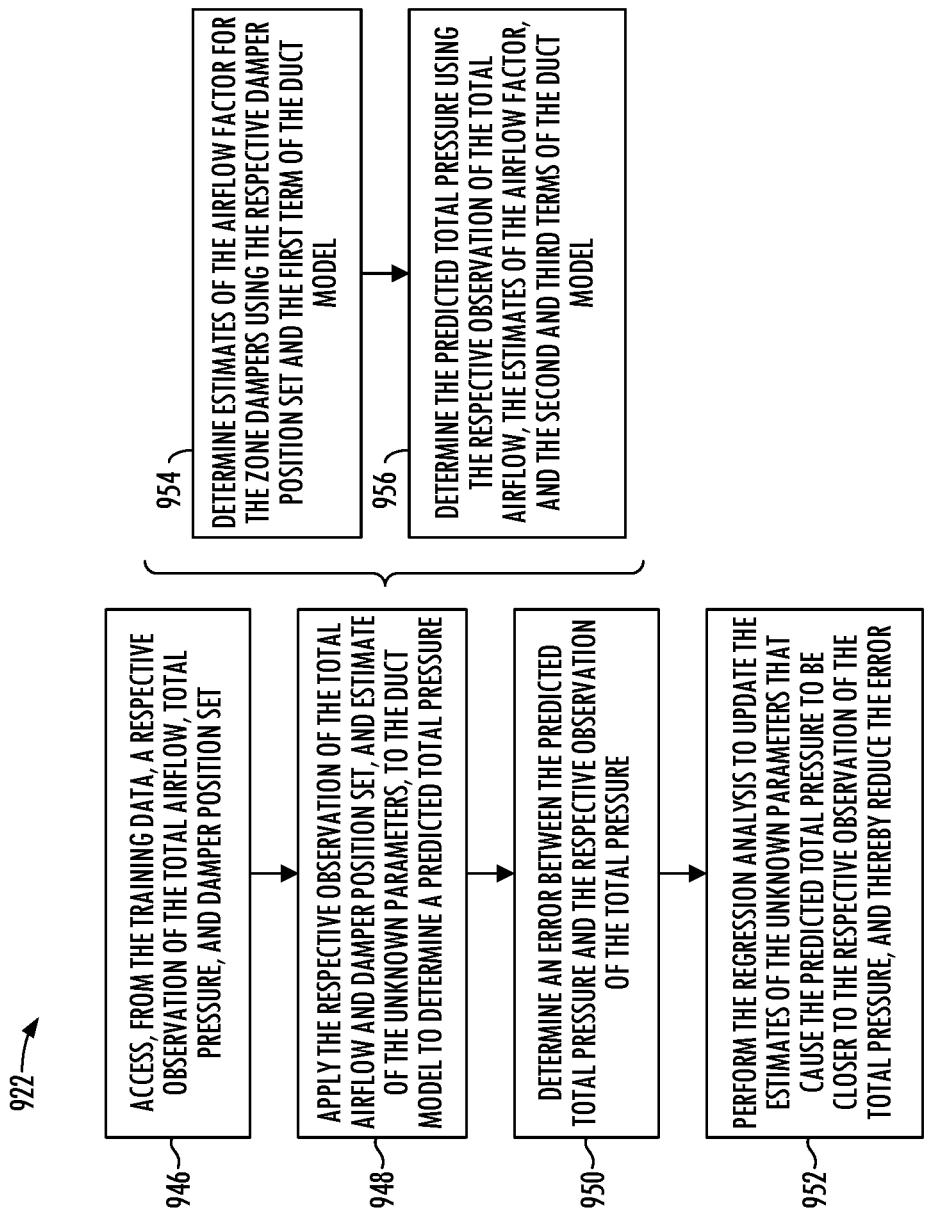

MODEL-BASED CONTROL OF ZONE DAMPERS IN AN HVAC SYSTEM

TECHNOLOGICAL FIELD

The present disclosure relates generally to control of heating, ventilation, and/or air conditioning (HVAC) systems, and in particular, model-based control of an HVAC system providing conditioned air to a conditioned space divided into zones.

BACKGROUND

Climate control systems, such as heating, ventilation, and/or air conditioning (HVAC) systems are used in residential and/or commercial areas to heat, cool or otherwise condition interior spaces. An HVAC system generally includes HVAC equipment with a fan such as an indoor fan configured to provide conditioned air to a conditioned space. The conditioned space may be divided into a plurality of zones. The HVAC equipment may include zone dampers to control airflow through respective air ducts to the zones. The function and control of these zone dampers may be accomplished according to a zoning algorithm.

The current zoning algorithm learns zone sizes through a test in which the HVAC system is run through a predefined set of damper positions and airflow rates while pressure is measured. The measured pressure values observed during that test are used to solve for a set of relative zone sizes, and the HVAC system uses these zone sizes and damper positions to control capacity flow into a zone.

The test according to which the current zoning algorithm learns the zone sizes assumes a linear relationship between a percent open state of a zone damper and its airflow, and it does not account for zone-specific branch interactions. That is, the HVAC system does not account for the effect of the zone damper position for one zone on the delivered airflow to another zone. Also, while the physical characteristics of a zone duct can change over time, the zone sizes generally remain static. This can lead to inaccurate delivery of capacity, an increased number and magnitude of duct pressure spikes, and airflow related noise issues.

BRIEF SUMMARY

Example implementations of the present disclosure provide an HVAC system and an associated model-based control of zone dampers in an HVAC system. The model-based control in some examples is built around a differentiable physical model of the duct, and uses backpropagation based regression to fit model parameters over a set of training data. The model in some examples is structured like a neural network with custom activation functions that mimic a simplified physical model of the duct with dampers. Using the fitted parameters, example implementations may take in a per-zone normalized airflow demand, and determine a set of damper positions, and perhaps also a total indoor airflow target that accurately achieves that demand. To insure model fitting accuracy, the training data may be sampled in real time and selectively stored in a manner that maximizes data diversity under fixed buffer size requirements.

The present disclosure thus includes, without limitation, the following example implementations.

Some example implementations provide a heating, ventilation, and air conditioning (HVAC) system comprising: HVAC equipment with a fan configured to provide conditioned air to a conditioned space that is divided into zones, and that is set up in an installation with ductwork that defines an air circulation path, and zone dampers controllable to regulate airflow of the conditioned air to respective ones of the zones; and control circuitry operably coupled to the HVAC equipment and configured to at least: receive an indication of zone airflow target values for the zones of the conditioned space; access a duct model including a first term that describes a flow factor for a zone damper as a nonlinear function of damper position, and a second term that describes zone airflow as a function of the flow factor and a branch pressure across zone-specific branches of the air circulation path; apply the zone airflow target values to the duct model to determine a damper position set; and actuate the zone dampers to respective damper positions of the damper position set.

In some example implementations of the HVAC system of any preceding example implementation, or any combination of any preceding example implementations, the control circuitry is configured to apply the zone airflow target values to the duct model to further determine a value of total airflow to achieve the zone airflow target values with a total pressure target, and wherein the control circuitry is further configured to cause the fan to provide the conditioned air with the value of the total airflow.

In some example implementations of the HVAC system of any preceding example implementation, or any combination of any preceding example implementations, the duct model includes unknown parameters, and the control circuitry is further configured to at least: determine values of the unknown parameters that are specific to the installation; and fit the duct model with the values of the unknown parameters.

In some example implementations of the HVAC system of any preceding example implementation, or any combination of any preceding example implementations, the control circuitry configured to determine the values of the unknown parameters includes the control is configured to at least: receive an indication of zone sizes, each of the zone sizes expressed as a maximum zone airflow for the zone with the zone damper in a fully-open position; and determine the values of the unknown parameters using the duct model and the zone sizes.

In some example implementations of the HVAC system of any preceding example implementation, or any combination of any preceding example implementations, the duct model further includes a third term that describes a shared pressure across a shared portion of the air circulation path as a function of total airflow, and the control circuitry configured to determine the values of the unknown parameters includes the control circuitry configured to at least: obtain training data that includes observations of the total airflow, observations of total pressure, and damper position sets, wherein the total pressure is a sum total of the branch pressure and the shared pressure; perform a regression analysis of the duct model using the training data and an estimate of the unknown parameters to determine updated estimates of the unknown parameters; and determine the values of the unknown parameters from the updated estimates of the unknown parameters.

In some example implementations of the HVAC system of any preceding example implementation, or any combination of any preceding example implementations, the control circuitry configured to obtain the training data includes the control circuitry configured to at least: obtain state vectors that represent states of the installation, and that include respective ones of the observations of the total airflow, the observations of the total pressure, and the damper position sets; select or reject the state vectors based on acceptability of the states and variation across the states of the installation, the acceptability of a state determined based on at least a metric that characterizes the state as steady-state or transient based on a respective state vector, the state being acceptable when the state is at least characterized as steady-state; and add the observations of the total airflow, the observations of the total pressure, and the damper position sets for those of the state vectors that are selected to the training data.

In some example implementations of the HVAC system of any preceding example implementation, or any combination of any preceding example implementations, the control circuitry configured to perform the regression analysis includes the control circuitry configured to at least: access, from the training data, a respective observation of the total airflow, a respective observation of the total pressure, and a respective damper position set; apply the respective observation of the total pressure, the respective damper position set, and the estimate of the unknown parameters, to the duct model to determine a predicted total airflow; determine an error between the predicted total airflow and the respective observation of the total airflow; and perform the regression analysis to update the estimates of the unknown parameters to the updated estimates of the unknown parameters that cause the predicted total airflow to be closer to the respective observation of the total airflow, and thereby reduce the error.

In some example implementations of the HVAC system of any preceding example implementation, or any combination of any preceding example implementations, the control circuitry configured to apply the respective observation of the total pressure, the respective damper position set, and the estimate of the unknown parameters, to the duct model to determine the predicted total airflow includes the control circuitry configured to at least: determine estimates of the flow factor for the zone dampers using the respective damper position set, and the first term of the duct model that describes the flow factor; perform a recursion to determine predicted zone airflows using the respective observation of the total pressure, the estimates of the flow factor, the second term of the duct model that describes the zone airflow, and the third term of the duct model that describes the shared pressure; and determine the predicted total airflow from the predicted zone airflows.

In some example implementations of the HVAC system of any preceding example implementation, or any combination of any preceding example implementations, the control circuitry configured to perform the regression analysis includes the control circuitry configured to at least: access, from the training data, a respective observation of the total airflow, a respective observation of the total pressure, and a respective damper position set; apply the respective observation of the total airflow and the respective damper position set, and the estimate of the unknown parameters, to the duct model to determine a predicted total pressure; determine an error between the predicted total pressure and the respective observation of the total pressure; and perform the regression analysis to update the estimates of the unknown parameters to the updated estimates of the unknown parameters that cause the predicted total pressure to be closer to the respective observation of the total pressure, and thereby reduce the error.

In some example implementations of the HVAC system of any preceding example implementation, or any combination of any preceding example implementations, the control circuitry configured to apply the respective observation of the total airflow and the respective damper position set, and the estimate of the unknown parameters, to the duct model to determine the predicted total pressure includes the control circuitry configured to at least: determine estimates of the flow factor for the zone dampers using the respective damper position set and the first term of the duct model that describes the flow factor; and determine the predicted total pressure using the respective observation of the total airflow, the estimates of the flow factor, the second term of the duct model restated to describe the branch pressure as a function of the total airflow and the flow factor for the zone dampers, and the third term of the duct model that describes the shared pressure.

In some example implementations of the HVAC system of any preceding example implementation, or any combination of any preceding example implementations, the control circuitry configured to apply the zone airflow target values to the duct model to determine the damper position set includes the control circuitry configured to at least: determine estimated maximums of the flow factor for the zone dampers in a fully-open position from the first term of the duct model that describes the flow factor; determine a maximum value of the branch pressure using the zone airflow target values, the estimated maximums of the flow factor, and the second term of the duct model restated to describe the branch pressure as a function of the zone airflow and the flow factor; determine estimates of the flow factor for the zone dampers using the maximum value of the branch pressure, the zone airflow target values, and the second term of the duct model restated to describe the flow factor as a function of the zone airflow and the branch pressure; and determine the damper position set using the estimates of the flow factor and the first term of the duct model restated to describe the damper position as a nonlinear function of the flow factor.

In some example implementations of the HVAC system of any preceding example implementation, or any combination of any preceding example implementations, the duct model further includes a third term that describes a shared pressure across a shared portion of the air circulation path as a function of total airflow, the zone airflow target values are applied to the duct model to further determine a value of the total airflow to achieve the zone airflow target values with a branch pressure target, and the control circuitry configured to apply the zone airflow target values to the duct model to determine the value of the total airflow includes the control circuitry configured to at least: determine an estimate of the total pressure using the maximum value of the branch pressure, an estimate of the total airflow as a sum total of the zone airflow target values, and the third term that describes the shared pressure; perform a recursion to determine predicted zone airflows using the estimate of the total pressure, the estimates of the flow factor, the second term of the duct model that describes the zone airflow, and the third term of the duct model that describes the shared pressure; and determine the value of the total airflow from the predicted zone airflows, and wherein the control circuitry is further configured to cause the fan to provide the conditioned air with the value of the total airflow.

Some example implementations provide a method of controlling a heating, ventilation, and air conditioning (HVAC) system that includes HVAC equipment with an fan configured to provide conditioned air to a conditioned space that is divided into zones, and that is set up in an installation with ductwork that defines an air circulation path, and zone dampers controllable to regulate airflow of the conditioned air to respective ones of the zones, the method comprising: receiving an indication of zone airflow target values for the zones of the conditioned space; accessing a duct model including a first term that describes a flow factor for a zone damper as a nonlinear function of damper position, and a second term that describes zone airflow as a function of the flow factor and a branch pressure across zone-specific branches of the air circulation path; applying the zone airflow target values to the duct model to determine a damper position set; and actuating the zone dampers to respective damper positions of the damper position set.

In some example implementations of the method of any preceding example implementation, or any combination of any preceding example implementations, the zone airflow target values are applied to the duct model to further determine a value of total airflow to achieve the zone airflow target values with a total pressure target, and wherein the method further comprises causing the fan to provide the conditioned air with the value of the total airflow.

In some example implementations of the method of any preceding example implementation, or any combination of any preceding example implementations, the duct model includes unknown parameters, and the method further comprises: determining values of the unknown parameters that are specific to the installation; and fitting the duct model with the values of the unknown parameters.

In some example implementations of the method of any preceding example implementation, or any combination of any preceding example implementations, determining the values of the unknown parameters comprises: receiving an indication of zone sizes, each of the zone sizes expressed as a maximum zone airflow for the zone with the zone damper in a fully-open position; and determining the values of the unknown parameters using the duct model and the zone sizes.

In some example implementations of the method of any preceding example implementation, or any combination of any preceding example implementations, the duct model further includes a third term that describes a shared pressure across a shared portion of the air circulation path as a function of total airflow, and determining the values of the unknown parameters comprises: obtaining training data that includes observations of the total airflow, observations of total pressure, and damper position sets, wherein the total pressure is a sum total of the branch pressure and the shared pressure; performing a regression analysis of the duct model using the training data and an estimate of the unknown parameters to determine updated estimates of the unknown parameters; and determining the values of the unknown parameters from the updated estimates of the unknown parameters.

In some example implementations of the method of any preceding example implementation, or any combination of any preceding example implementations, obtaining the training data comprises: obtaining state vectors that represent states of the installation, and that include respective ones of the observations of the total airflow, the observations of the total pressure, and the damper position sets; selecting or rejecting the state vectors based on acceptability of the states and variation across the states of the installation, the acceptability of a state determined based on at least a metric that characterizes the state as steady-state or transient based on a respective state vector, the state being acceptable when the state is at least characterized as steady-state; and adding the observations of the total airflow, the observations of the total pressure, and the damper position sets for those of the state vectors that are selected to the training data.

In some example implementations of the method of any preceding example implementation, or any combination of any preceding example implementations, performing the regression analysis comprises: accessing, from the training data, a respective observation of the total airflow, a respective observation of the total pressure, and a respective damper position set; applying the respective observation of the total pressure, the respective damper position set, and the estimate of the unknown parameters, to the duct model to determine a predicted total airflow; determining an error between the predicted total airflow and the respective observation of the total airflow; and performing the regression analysis to update the estimates of the unknown parameters to the updated estimates of the unknown parameters that cause the predicted total airflow to be closer to the respective observation of the total airflow, and thereby reduce the error.

In some example implementations of the method of any preceding example implementation, or any combination of any preceding example implementations, applying the respective observation of the total pressure, the respective damper position set, and the estimate of the unknown parameters, to the duct model to determine the predicted total airflow comprises: determining estimates of the flow factor for the zone dampers using the respective damper position set, and the first term of the duct model that describes the flow factor; performing a recursion to determine predicted zone airflows using the respective observation of the total pressure, the estimates of the flow factor, the second term of the duct model that describes the zone airflow, and the third term of the duct model that describes the shared pressure; and determining the predicted total airflow from the predicted zone airflows.

In some example implementations of the method of any preceding example implementation, or any combination of any preceding example implementations, performing the regression analysis comprises: accessing, from the training data, a respective observation of the total airflow, a respective observation of the total pressure, and a respective damper position set; applying the respective observation of the total airflow and the respective damper position set, and the estimate of the unknown parameters, to the duct model to determine a predicted total pressure; determining an error between the predicted total pressure and the respective observation of the total pressure; and performing the regression analysis to update the estimates of the unknown parameters to the updated estimates of the unknown parameters that cause the predicted total pressure to be closer to the respective observation of the total pressure, and thereby reduce the error.

In some example implementations of the method of any preceding example implementation, or any combination of any preceding example implementations, applying the respective observation of the total airflow and the respective damper position set, and the estimate of the unknown parameters, to the duct model to determine the predicted total pressure comprises: determining estimates of the flow factor for the zone dampers using the respective damper position set and the first term of the duct model that describes the flow factor; and determining the predicted total pressure using the respective observation of the total airflow, the estimates of the flow factor, the second term of the duct model restated to describe the branch pressure as a function of the total airflow and the flow factor for the zone dampers, and the third term of the duct model that describes the shared pressure.

In some example implementations of the method of any preceding example implementation, or any combination of any preceding example implementations, applying the zone airflow target values to the duct model to determine the damper position set comprises: determining estimated maximums of the flow factor for the zone dampers in a fully-open position from the first term of the duct model that describes the flow factor; determining a maximum value of the branch pressure using the zone airflow target values, the estimated maximums of the flow factor, and the second term of the duct model restated to describe the branch pressure as a function of the zone airflow and the flow factor; determining estimates of the flow factor for the zone dampers using the maximum value of the branch pressure, the zone airflow target values, and the second term of the duct model restated to describe the flow factor as a function of the zone airflow and the branch pressure; and determining the damper position set using the estimates of the flow factor and the first term of the duct model restated to describe the damper position as a nonlinear function of the flow factor.

In some example implementations of the method of any preceding example implementation, or any combination of any preceding example implementations, the duct model further includes a third term that describes a shared pressure across a shared portion of the air circulation path as a function of total airflow, the zone airflow target values are applied to the duct model to further determine a value of the total airflow to achieve the zone airflow target values with a branch pressure target, and applying the zone airflow target values to the duct model to determine the value of the total airflow comprises: determining an estimate of the total pressure using the maximum value of the branch pressure, an estimate of the total airflow as a sum total of the zone airflow target values, and the third term that describes the shared pressure; performing a recursion to determine predicted zone airflows using the estimate of the total pressure, the estimates of the flow factor, the second term of the duct model that describes the zone airflow, and the third term of the duct model that describes the shared pressure; and determining the value of the total airflow from the predicted zone airflows, and wherein the method further comprises causing the fan to provide the conditioned air with the value of the total airflow.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 9A, 9B, 9C, 9D, 9E, 9F, 9G and 9H are flowcharts illustrating various operations in a method of controlling an HVAC system, according to some example implementations.

DETAILED DESCRIPTION

Figure 1:
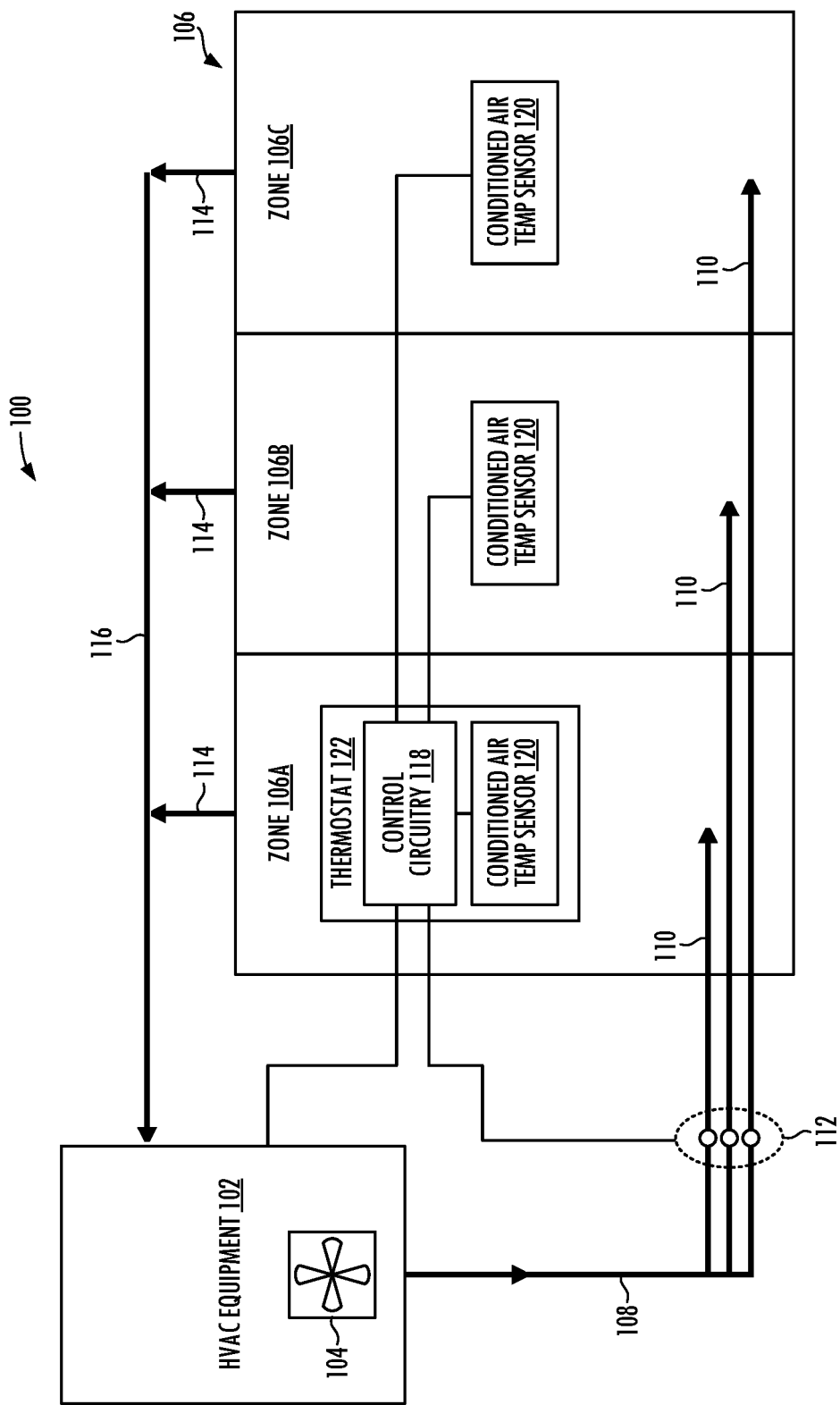
FIG. 1 is a block diagram of a heating, ventilation, and air conditioning (HVAC) system according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

Example implementations of the present disclosure relate generally to control of heating, ventilation, and/or air conditioning (HVAC) systems, and in particular, model-based control of zone dampers in an HVAC system. As explained in greater detail below, some examples include implementing a test profile in which airflow and zone damper positions in the HVAC system are adjusted to learn about the duct configuration. A sample selection may be used to read observations of total pressure, total airflow, and sets of damper positions, and store some of those measured points in training data. A duct model with a set of floating parameters initialized at some value may be evaluated over the training data, and an error indicative of the duct model's ability to predict total airflow as a function of a damper position set and a pressure drop. The error may be minimized by adjusting the value of the floating parameters, and this may be performed using gradient descent regression.

The duct model with the fitted parameters may be deployed to determine a set of normalized zone sizes. After initial setup, HVAC system may be driven by external per zone airflow requests. The duct model may be used to determine a damper position set, and an air handler airflow demand, that achieves desired per zone airflows while minimizing static pressure. Data from regular operation may be fed back to the sample selection, which may continue to update the training data without increasing its size. The training data may be continually used to evaluate the duct model, adjust its floating parameters, and maintain the duct model in a well-fitted state and account for changes to the system such as reshaping of the ducts or changes to vents.

FIG. 1 is a block diagram of an HVAC system 100 according to some example implementations of the present disclosure. The HVAC system generally includes HVAC equipment 102 with a fan 104 such as an indoor fan configured to provide conditioned air to a conditioned space 106, which in some examples may be divided into a plurality of zones 106A, 106B, 106C (each of which may itself be a conditioned space). It will be appreciated that while three zones are shown, any number of zones may be present. It will also be appreciated that references to the conditioned zone may be equally applicable to one or more zones of the conditioned space, each of which, again, may itself be a conditioned space.

The HVAC equipment 102 may include an indoor unit, an outdoor unit, and a refrigerant loop extending between the indoor unit and the outdoor unit. The indoor unit may include a furnace or air handler, an indoor refrigerant heat exchanger or evaporator to condition air (heat or cool), and the fan 104 to circulate or otherwise provide the conditioned air to the conditioned space. The outdoor unit may include an outdoor fan and an outdoor refrigerant heat exchanger or condenser, and the refrigerant loop may extend between the indoor and outdoor refrigerant heat exchangers.

The HVAC system 100 may include an air circulation path with supply air ducts including a main supply air duct 108 and zone supply air ducts 110 through which the conditioned air from the HVAC equipment 102 is provided to the zones 106A, 106B, 106C of the conditioned space 106; and to control airflow to the zones, the HVAC equipment may include zone dampers 112. The air circulation path also includes return air ducts including zone return air ducts 114 and a main return air duct 116 operably coupleable with the HVAC equipment, and through which air in the zones of the conditioned space is returned to the HVAC equipment as return air.

The HVAC system 100 includes control circuitry 118 operably coupled with the HVAC equipment 102, and configured to control the HVAC equipment to provide the conditioned air to heat or cool the conditioned space 106, or in some examples, zones 106A, 106B, 106C of the conditioned space. In some examples, the control circuitry is configured to control the HVAC equipment based on environmental feedback from one or more sensors operably coupled to the control circuitry. In this regard, the HVAC system may include at least one temperature sensor, and the control circuitry may be configured to control the HVAC equipment to provide the conditioned air based on observations of measured temperature so that zone temperature is maintained at or near its setpoint temperature.

In particular, for example, the HVAC system 100 may include a conditioned air temperature sensor 120 in the conditioned space 106 configured to measure temperature in the conditioned space. In some examples, as shown, one or more of the zones 106A, 106B, 106C may include a respective conditioned air temperature sensor for the zone and configured to measure temperature in the zone. In some examples, the control circuitry 118 (or some portion of the control circuitry) and a conditioned air temperature sensor may be co-located in a thermostat 122. In other examples, the control circuitry and the conditioned air temperature sensor may be separated and connected by wire or wirelessly; and in some of these examples, the conditioned air temperature sensor may be co-located with other electronic devices or circuitry such as a display device, network adapter, or the like.

According to some example implementations of the present disclosure, the control circuitry 118 is configured to receive an indication of zone airflow target values for the zones 106A, 106B, 106C of the conditioned space 106. In some examples, the control circuitry may receive zone setpoint temperatures (that may be different or the same across all of the zones) via the thermostat 122, observations of measured temperature from the conditioned air temperature sensor(s) 120, and determine the zone airflow target values sufficient to maintain zone temperatures at or near the setpoint temperatures.

The control circuitry 118 is configured to access a duct model including a first term that describes a flow factor for a zone damper as a nonlinear function of damper position, and a second term that describes zone airflow as a function of the flow factor and a branch pressure across zone-specific branches of the air circulation path defined by the ductwork 108, 110, 114, 116. In some examples, the duct model further includes a third term that describes a shared pressure across a shared portion of the air circulation path as a function of total airflow. In some examples, airflows such as the zone airflow and total airflow may be normalized to a nominal airflow; in other examples, the airflows are not normalized.

More notationally, for example, in the HVAC system 100 with Z zone dampers 112, the first term of the duct model may describe the flow factor $Kv_z$ for a zone damper $z \in Z$ as a nonlinear function of the damper position $Pos_z$ as follows:

$$Kv_z = \frac{A_z}{(1 + \exp(-B_z \times (Pos_z - C_z)))} \quad (1)$$

Similarly, the second term may describe zone airflow $\dot{Q}_z$ as a function of the flow factor and a branch pressure $\Delta P$ across zone-specific branches of the air circulation path as follows:

$$\dot{Q}_z = Kv_z \times (\Delta P)^{\frac{1}{n_z}} \quad (2)$$

The third term may describe a shared pressure $\Delta P_L$ across a shared portion of the air circulation path as a function of total airflow $\dot{Q}$:

$$\Delta P_L = \left(\frac{\dot{Q}}{L}\right)^{1.5}, \dot{Q} = \sum \dot{Q}_z \quad (3)$$

In equations (1), (2) and (3), $A_z$, $B_z$, $C_z$, $n_z$ and $L$ are unknown parameters whose values may be determined and specific to the installation.

A total pressure $\Delta P_t$ may also be expressed as a sum total of the branch pressure $\Delta P$ and the shared pressure $\Delta P_L$:

$$\Delta P_t = \Delta P + \Delta P_L \tag{4}$$

In some examples, the total pressure may be saturated below a maximum allowed total pressure, which may be specified by an installer of the HVAC system 100. This maximum $\Delta P_{Max}$ may be expressed in the total pressure as follows:

$$\Delta P_t = \min(\Delta P_t, \Delta P_{Max}) \tag{5}$$

The control circuitry 118 is configured to apply the zone airflow target values to the duct model to determine a damper position set, and actuate the zone dampers 112 to respective damper positions of the damper position set. For the set of zone dampers, for example, the control circuitry may apply the zone airflow target values $\{\dot{Q}_{z\,Req}\}$ to the duct model to determine a damper position set $\{Pos_z\}$. In some examples, the control circuitry is configured to apply the zone airflow target values to the duct model to further determine a value of total airflow to achieve the zone airflow target values with a total pressure target, and cause the fan 104 to provide the conditioned air with the value of the total airflow.

In some examples, the control circuitry 118 is configured to determine estimated maximums of the flow factor for the zone dampers 112 in a fully-open position from the first term of the duct model that describes the flow factor. This may include the control circuitry configured to solve equation (1) for $Kv_z$ with $Pos_z=1.0$ to express the zone damper in the fully-open position, and this $Kv_z$ may be the maximum flow factor for the zone damper $Kv_{z\,Max}$. The control circuitry is configured to determine a maximum value of the branch pressure using the zone airflow target values, the estimated maximums of the flow factor, and the second term of the duct model restated to describe the branch pressure as a function of the zone airflow and the flow factor. The second term restated in this manner may be expressed as:

$$\Delta P_{zOpen} = \left(\frac{\dot{Q}_{zReq}}{Kv_{zMax}}\right)^{n_z}, \Delta P = \max(\Delta P_{zOpen}) \tag{6}$$

The control circuitry 118 is configured to determine estimates of the flow factor for the zone dampers 112 using the maximum value of the branch pressure, the zone airflow target values, and the second term of the duct model restated to describe the flow factor as a function of the zone airflow and the branch pressure. The second term restated here may be expressed as:

$$Kv_z = \frac{\dot{Q}_{zReq}}{(\Delta P)^{\frac{1}{n_z}}} \tag{7}$$

And the control circuitry is configured to determine the damper position set using the estimates of the flow factor, and the first term of the duct model restated to describe the damper position as a nonlinear function of the flow factor, which may be expressed as:

$$Pos_z = C_z - \frac{\log\left(\frac{A_z}{Kv_z} - 1.0\right)}{B_z} \tag{8}$$

In some further examples, the control circuitry 118 is configured to determine an estimate of the total pressure using the maximum value of the branch pressure, an estimate of the total airflow as the sum total of the zone airflow target values, and the third term that describes the shared pressure. In some of these examples, the control circuitry is configured to perform a recursion to determine predicted zone airflows using the estimate of the total pressure, the estimates of the flow factor, the second term of the duct model that describes the zone airflow, and the third term of the duct model that describes the shared pressure. The control circuitry is configured to determine the value of the total airflow from the predicted zone airflows. Then, in a manner similar to that described above, the control circuitry is configured to cause the fan 104 to provide the conditioned air with the value of the total airflow.

In particular, for example, the control circuitry 118 may determine an estimate of the total pressure $\Delta P_t$ as expressed above in equation (4), using the maximum value of the branch pressure $\Delta P$, an estimate of the total airflow as the sum total of the zone airflow target values $\Sigma \dot{Q}_{z\,Req}$, and the third term that describes the shared pressure $\Delta P_L$ as expressed above in equation (3). The control circuitry may perform a recursion with the iterative total pressure drop loop to determine predicted zone airflows:

$$\dot{Q}_z = Kv_z \times (\Delta P_t)^{\frac{1}{n_z}}$$

For $i = 1:10$ $$\Delta P_L = 0.8 \times \Delta P_L + 0.2 \times \left(\frac{\sum \dot{Q}_z}{L}\right)^{1.5}$$

$$\Delta P = \Delta P_t - \Delta P_L$$

$$\dot{Q}_z = Kv_z \times (\Delta P)^{\frac{1}{n_z}}$$

end

The control circuitry may then determine the value of the total airflow from which to set the fan 104 from the predicted zone airflows, and the total airflow may be normalized to the value NominalAirflow:

$$\text{TotalAirflow} = \text{NominalAirflow} \times (\Sigma \dot{Q}_z) \tag{9}$$

In equation (9), the total airflow is saturated to between a nominal airflow and a minimum airflow:

$$\text{TotalAirflow} = \min(\max(\text{TotalAirflow}, \text{MinAirflow}), \text{NominalAirflow}) \tag{10}$$

In some examples, the control circuitry 118 is further configured to determine values of the unknown parameters that are specific to the installation, and fit the duct model with the values of the unknown parameters. In some further examples, the control circuitry is configured to receive an indication of zone sizes, each of the zone sizes expressed as a maximum zone airflow for the zone with the zone damper in a fully-open position; and in some of these examples, the control circuitry is configured to determine the values of the unknown parameters using the duct model and the zone sizes.

The zone size may be indicative of the maximum capacity and airflow that can be delivered through each duct branch; and internally, it may be defined in units normalized to the indoor nominal airflow. If the zone size values are manually defined, it may first be assumed that at nominal airflow, half of the total pressure drop is due to the shared flow path losses:

$$\Delta P_L = \frac{\Delta P_{Max}}{2} \quad (11)$$

From that, the value for the parameter L may be determined using the third term of the duct model:

$$L = (\Delta P_L)^{\frac{-1}{1.5}} \quad (12)$$

The pressure across each zone branch may be determined assuming a normalized airflow equal to the manual zone size is delivered through it:

$$\Delta P_{zOpen} = \Delta P_{Max} - \left(\frac{ManualZoneSize}{L}\right)^{1.5} \quad (13)$$

From that, the zone flow coefficient may be determined using the second term of the duct model, and assuming the parameter n is at a nominal value of 1.5:

$$Kv_z = \frac{ManualZoneSize}{(\Delta P_{ZOpen})^{1/n_z}} \quad (14)$$

And the A parameter may be determined using the first term of the duct model, and assuming a nominal value of 8 for the B parameter and 0.5 for the C parameter:

$$A_z = Kv_z \times (1 + \exp(-B_z \times (1 - C_z))) \quad (15)$$

In some examples, the control circuitry 118 may determine values of the unknown parameters using regression analysis. In some of these examples, the control circuitry is configured to obtain training data that includes observations of the total airflow, observations of total pressure, and damper position sets. The control circuitry may determine the observations of the total airflow and total pressure from torque and speed of the fan 104, or more particularly a motor driving the fan. The control circuitry is configured to perform a regression analysis of the duct model using the training data and an estimate of the unknown parameters to determine updated estimates of the unknown parameters, and determine the values of the unknown parameters from the updated estimates of the unknown parameters.

To further illustrate the control circuitry 118 configured to obtain the training data, the control circuitry may run through a test to characterize the duct after an initial setup process for zoning. The test may include a number of predefined position sets and relative airflow demands that may increase with the number of installed zones, and the control circuitry may wait a fixed amount of time at each set before switching to the next. This wait period may include the time needed for the zone dampers 112 and the air handler to reach their new requested values, added to a short settling time so that a steady sample may be detected and stored.

The relative airflow may be defined between two flow values, which may be normalized as described above. An air handler minimum airflow may be represented by 0, and a maximum test airflow may be represented by 1. The maximum test airflow may be initialized at the minimum air handler airflow for a first state of the test; and after running there for the wait period, the maximum test airflow may be recalculated as:

$$MaxTestAirflow = \frac{MeasuredAirflow}{\sqrt{\frac{MeasuredPressure}{0.5 \times MaxPressure}}} \quad (16)$$

For a second state of the test, the control circuitry 118 may request the new maximum test airflow at the same zone damper positions. After running there for the wait period, the maximum test airflow may be updated again using the same equation.

After the second state of the test, the maximum test airflow value may be fixed, and the control circuitry 118 may run the next three states, each adjusting the damper position for a first of the zones and the requested airflow value. The requested airflow for each step may calculated from relative airflow:

Airflow=MinAirflow+RelativeAirflow×(MaxTestAirflow−MinAirflow) (17)

The control circuitry may repeat this for all of the zone dampers 112, adding a number of additional states for each zone, and running for the predefined wait period at each state. And the control circuitry may through the test collect observations of the total airflow, observations of total pressure, and damper position sets.

The control circuitry 118 may be configured to select and store a good diverse set of training data. The training data may have a fixed buffer size, and the control circuitry may be configured to maximize diversity of the training data without exceeding that size limit. In some examples, then, the control circuitry is configured to obtain state vectors that represent states of the installation, and that include respective ones of the observations of the total airflow, the observations of the total pressure, and the damper position sets. The control circuitry is configured to select or reject the state vectors based on acceptability of the states and variation across the states of the installation. The acceptability of a state is determined based on at least a metric that characterizes the state as steady-state or transient based on a respective state vector, and the state is acceptable when the state is at least characterized as steady-state. The control circuitry is then configured to add the observations of the total airflow, the observations of the total pressure, and the damper position sets for those of the state vectors that are selected to the training data.

More particularly, the control circuitry 118 may obtain observations of the total airflow, the total pressure, and the damper position sets at a fixed interval, formatted into the state vectors that represent states of the installation:

StateVector=[$\dot{Q}, \Delta P_t, \{Pos_z\}$]

The control circuitry may only allow steady data into a buffer in which the training data is stored, and the criteria to determine how steady the sample may be a function of a normalized state vector derivative:

$$TransientCost = SampleRate \times \left( \frac{|StateVector - LastStateVector|}{NormVector} \right) \quad (18)$$

This transient cost vector may be set to the nominal airflow for the TotalAirflow state, 1 for the measured pressure, and 0.25 for all zone damper positions:

NormVector=[NominalAirflow, 1.0, 0.25, 0.25, 0.25, 0.25, 0.25, 0.25]

The transient cost vector may be low pass filtered with a time constant (e.g., five seconds) to reject noise:

$$FiltTransientCost = \qquad\qquad\qquad (19)$$
$$\frac{FiltTransientCost \times (5 \times sampleRate - 1)}{5 \times sampleRate} + \frac{TransientCost}{5 \times sampleRate}$$

The resulting FiltTransientCost may be a metric that characterizes the state as steady-state or transient based on a respective state vector.

The control circuitry 118 may compare the state with the maximum filtered transient cost against a threshold, and allow the sample in for further processing when its maximum transient cost is lower than the threshold. The control circuitry may also check that at least one damper position is sufficiently opened (e.g., more than 30% opened) to allow a sample in, and that the total measured airflow is higher than some threshold (e.g., 200 CFM). Assuming that the sample is not rejected, the control circuitry may compare its usefulness to the model against all other stored states in the buffer. The control circuitry may assume that a more diverse or varied set of data will lead to improved learning and a better-fitted model, and measure sample variation using the mean normalized difference between stored states.

The control circuitry 118 may determine a variation score for a new sample by first taking the normalized difference between its states and those of all other stored samples. The mean normalized difference across all states may be determined for each stored state vector, giving a mean relative difference value for each stored state. In this regard, the minimum relative difference value may be defined as the variation score for the new sample vector:

for (StoredStateVector in AllStoredStateVector)

$$RelativeDifference = \left| \frac{StateVector - StoredStateVector}{NormVector} \right|$$

RelativeDifference = mean(RelativeDifference)

VariationScore = min(VariationScore, RelativeDifference)

end

If the variation score is lower than the variation score for all other stored state vectors, the control circuitry 118 may add the sample to the set of stored state vectors. In some examples, the added sample may replace another sample in the buffer such as the sample with the lowest variation score or the sample closest to the added sample. The sample may also enter the buffer if the result of a stochastic function allows it, and in that case, the sample may replace another sample such as a randomly-selected sample or the sample with the highest variation score. The stochastic function may be designed to allow a fixed number of samples per day on average, and the likelihood of it returning true may be determined as:

$$RandomSelectLikelyhood = \qquad\qquad (20)$$
$$100\% \times \frac{RandomSampleRate \times miniBatchSize}{(60 \times 24 \times SampleRate)}$$

In equation (20), RandomSampleRate is a constant with a value set to define turnover of samples in the buffer. When the value is set to 0.5, for example, if steady state and minimum variation score conditions meet every minute, half of the buffer size will be replaced every day. In reality, the number of stored samples that are replaced by random ones per day may be much smaller, because random samples are more likely to be removed by other more varied samples.

The control circuitry 118 may again determine the variation score for the stored state vectors after adding in the new sample to the buffer:

for (StoredStateVector in AllStoredStateVector)
  StateVector = StoredStateVector
  i = 0
  for (StoredStateVector in AllStoredStateVector)

$$RelativeDifference = \left| \frac{StateVector - StoredVector}{NormVector} \right|$$

RelativeDifference = mean(RelativeDifference)
    VariationScore[i] =
      min(VariationScore[i], RelativeDifference)
    i = i + 1
  end
end At the end of each function call, the stored state matrix may be broken up into three training datasets, one for the observations of the total airflow, a second for the observations of the total pressure, and a third for the damper position sets.

Figure 2:
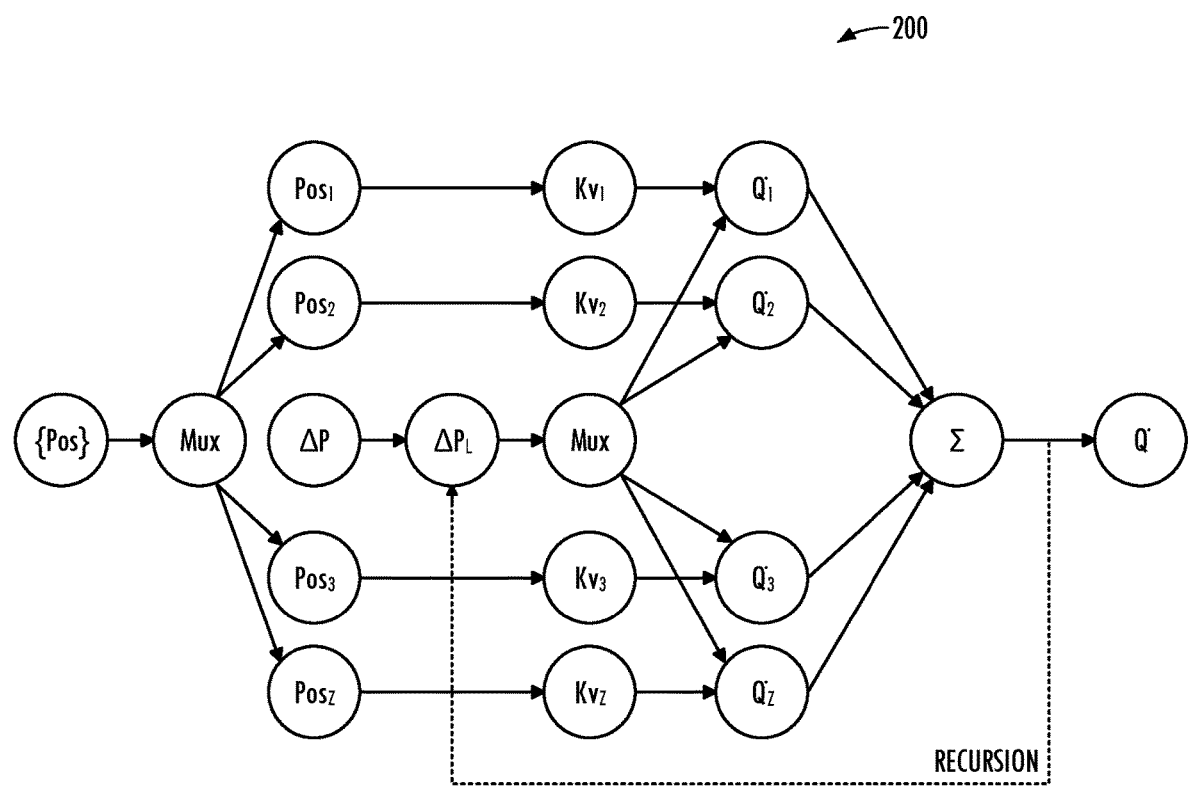
FIG. 2 illustrates a duct model for airflow-based learning, according to some example implementations.

Regardless of exactly how the training data is obtained, the control circuitry 118 may perform a regression analysis of the duct model using the training data. This may involve a differential physical model of the duct that is the same as or similar to that described above, and use of back propagation based regression to fit the unknown parameters. FIG. 2 illustrates a duct model 200 according to some example implementations. As shown, the duct model is structured like a recursive neural network with custom activation functions that mimic a simplified physical model of the duct with zone dampers 112. In the forward path, the duct model takes a damper position set and total pressure as an input, and outputs a predicted total airflow.

In some examples, the regression analysis includes the control circuitry 118 configured to access, from the training data, a respective observation of the total airflow, a respective observation of the total pressure, and a respective damper position set. The control circuitry is configured to apply the respective observation of the total pressure, the respective damper position set, and the estimate of the unknown parameters, to the duct model to determine a predicted total airflow. The control circuitry is configured to determine an error between the predicted total airflow and the respective observation of the total airflow. And the control circuitry is configured to perform the regression analysis to update the estimates of the unknown parameters to the updated estimates of the unknown parameters that cause the predicted total airflow to be closer to the respective observation of the total airflow, and thereby reduce the error.

In some further examples, the control circuitry 118 is configured to determine estimates of the flow factor for the zone dampers 112 using the respective damper position set, and the first term of the duct model that describes the flow factor. The control circuitry is configured to perform a recursion to determine predicted zone airflows using the respective observation of the total pressure, the estimates of the flow factor, the second term of the duct model that describes the zone airflow, and the third term of the duct model that describes the shared pressure. The control circuitry is then configured to determine the predicted total airflow from the predicted zone airflows.

Even more particularly, for example, the regression analysis may include the control circuitry 118 configured to first execute the duct model in the forward path, starting with the estimate of the unknown parameters. One example of a suitable estimate includes values of the unknown parameters that are the same across all of the zone dampers 112, and that are set as follows: A=1.00, B=8.00, C=0.50, n=1.5 and L=2.0. Each step in the forward path may be followed by a calculation of its partial derivatives with respect to the parameters, which may be used to efficiently determine gradients in a backpropagation.

The control circuitry 118 may evaluate the duct model using a respective damper position set {$Pos_z$} and observation of the total pressure $\Delta P_t$ from the training data, and the output is a predicted total airflow $\dot{Q}$. The flow factor $Kv_z$ for all zone dampers 112 may be determined using the respective damper position set, and the first term of the duct model as expressed above in equation (1). The partial derivatives of this term with respect to parameters A, B and C may be determined:

$$\frac{\partial Kv_z}{\partial A_z} = \frac{1}{(1 + \exp(-B_z \times (Pos_z - C_z)))} \quad (21)$$

$$\frac{\partial Kv_z}{\partial B} = -\frac{A_z \times \exp(-B_z \times (Pos_z - C_z))}{(1 + \exp(-B_z \times (Pos_z - C_z)))^2} \times (-Pos_z + C_z) \quad (22)$$

$$\frac{\partial Kv_z}{\partial C} = \frac{A_z \times \exp(-B_z \times (Pos_z - C_z))}{(1 + \exp(-B_z \times (Pos_z - C_z)))^2} \times (-B_z) \quad (23)$$

The control circuitry 118 may at first predict the zone airflows $\dot{Q}_z$ assuming no shared pressure loss using the flow factor, the observation of the total pressure $\Delta P_t$, and the second term of the duct model as expressed above in equation (2). The actual branch pressure may be lower than the measured value due to the shared path pressure loss. This term and the resulting pressure, then, may be predicted using a recursion. In this regard, the zone airflows may be determined, then the predicted pressure updated, and the zone airflows predicted again using the new pressure estimate. This process may be repeated a number of times (e.g., 10 times), and the change may be filtered to improve convergence robustness. The result of this process is a valid predicted pressure and airflow set pair:

$\Delta P_L = 0$

For $i = 1{:}10$

-continued $$\Delta P_L = 0.8 \times \Delta P_L + 0.2 \times \left(\frac{\sum \dot{Q}_z}{L}\right)^{1.5}$$

$$\Delta P = \Delta P_t - \Delta P_L$$

$$\dot{Q}_z = Kv_z \times (\Delta P)^{\frac{1}{n_z}}$$

end

The partial derivatives of the branch pressure $\Delta P$ with respect to the parameter L may be determined after going through the recursion:

$$\frac{\partial \Delta P}{\partial L} = 1.5 \times \left(\sum \dot{Q}_z\right)^{1.5} \times \left(\frac{1}{L}\right) \times \left(\frac{-1}{L^2}\right) \quad (24)$$

The predicted total airflow $\dot{Q}_{Predicted}$ may be determined by adding up the zone airflows $\dot{Q}_z$, and the total airflow partial derivatives with respect to the branch pressure, the flow factor values, and to the parameter n may be determined:

$$\frac{\partial \dot{Q}}{\partial \Delta P} = \frac{1}{n} \times Kv \times \Delta P^{\left(\frac{1}{n}-1\right)} \quad (25)$$

$$\frac{\partial \dot{Q}}{\partial Kv_z} = \Delta P^{\left(\frac{1}{n_z}\right)} \quad (26)$$

$$\frac{\partial \dot{Q}}{\partial n_z} = Kv_z \times \left(-\frac{1}{n_z^2}\right) \times \log(\Delta P) \times \Delta P^{\left(\frac{1}{n_z}\right)} \quad (27)$$

The squared difference between the predicted total airflow and the respective observation of the total airflow in the training data may be used as an error function for parameter regression to minimize:

$$\text{Error} = \frac{1}{2}\left(\dot{Q}_{Predicted} - \dot{Q}\right)^2 \quad (28)$$

The partial derivative of the error function with respect to the predicted total airflow may be:

$$\frac{\partial \text{Error}}{\partial \dot{Q}} = \dot{Q}_{Predicted} - \dot{Q} \quad (29)$$

For the backpropagation and update, the partial derivatives of the error with respect to each parameter may be determined using the chain rule:

$$\frac{\partial \text{Error}}{\partial A_z} = \frac{\partial \text{Error}}{\partial \dot{Q}} \times \frac{\partial \dot{Q}}{\partial Kv_z} \times \frac{\partial Kv_z}{\partial A_z} \quad (30)$$

$$\frac{\partial \text{Error}}{\partial B_z} = \frac{\partial \text{Error}}{\partial \dot{Q}} \times \frac{\partial \dot{Q}}{\partial Kv_z} \times \frac{\partial Kv_z}{\partial B_z} \quad (31)$$

$$\frac{\partial \text{Error}}{\partial C_z} = \frac{\partial \text{Error}}{\partial \dot{Q}} \times \frac{\partial \dot{Q}}{\partial Kv_z} \times \frac{\partial Kv_z}{\partial C_z} \quad (32)$$

$$\frac{\partial \text{Error}}{\partial n_z} = \frac{\partial \text{Error}}{\partial \dot{Q}} \times \frac{\partial \dot{Q}}{\partial n_z} \quad (33)$$

-continued $$\frac{\partial \text{Error}}{\partial L} = \frac{\partial \text{Error}}{\partial \dot{Q}} \times \frac{\partial \dot{Q}}{\partial \Delta P} \times \frac{\partial \Delta P}{\partial L} \tag{34}$$

Those terms may be evaluated for each state vector in the training data, and the results may be stored in a matrix of size (5× Z):

$$\text{Gradients} = \begin{bmatrix} \frac{\partial \text{Error}}{\partial A_1} & \frac{\partial \text{Error}}{\partial A_2} & \frac{\partial \text{Error}}{\partial A_3} & \frac{\partial \text{Error}}{\partial A_4} & \cdots & \frac{\partial \text{Error}}{\partial A_Z} \\ \frac{\partial \text{Error}}{\partial B_1} & \frac{\partial \text{Error}}{\partial B_2} & \frac{\partial \text{Error}}{\partial B_3} & \frac{\partial \text{Error}}{\partial B_4} & \cdots & \frac{\partial \text{Error}}{\partial B_Z} \\ \frac{\partial \text{Error}}{\partial C_1} & \frac{\partial \text{Error}}{\partial C_2} & \frac{\partial \text{Error}}{\partial C_3} & \frac{\partial \text{Error}}{\partial C_4} & \cdots & \frac{\partial \text{Error}}{\partial C_Z} \\ \frac{\partial \text{Error}}{\partial n_1} & \frac{\partial \text{Error}}{\partial n_2} & \frac{\partial \text{Error}}{\partial n_3} & \frac{\partial \text{Error}}{\partial n_4} & \cdots & \frac{\partial \text{Error}}{\partial n_Z} \\ \frac{\partial \text{Error}}{\partial L} & \frac{\partial \text{Error}}{\partial L} & \frac{\partial \text{Error}}{\partial L} & \frac{\partial \text{Error}}{\partial L} & \cdots & \frac{\partial \text{Error}}{\partial L} \end{bmatrix}$$

The estimates may then be updated from the gradients, such as according to a stochastic gradient descent like AdaMax:

$$t = t + 1 \tag{35}$$

$$m = \beta_1 \times m + (1 - \beta_1) \times \text{Gradients} \tag{36}$$

$$v = \max(\beta_2 \times v, |\text{Gradients}|) \tag{37}$$

$$\text{ParameterUpdate} = -\eta \times \frac{m}{(1 - \beta_1^t)(v + \epsilon)} \tag{38}$$

In the above, t, m and v are persistent variables; $\beta_1$ and $\beta_2$ are fixed hyperparameters set to respectively 0.9 and 0.999; $\eta$ is a default learning rate that may be set to a fixed value (e.g., 0.005); and $\epsilon$ is a small number (e.g., $1 \times 10^{-8}$) added to prevent division by zero.

Each stored state vector in the buffer of training data may output a matrix (Parameter Update), and the results may be averaged across the training data, and the result may be used to modify the parameter values:

$$\text{Parameters} = \begin{bmatrix} A_1 & A_2 & A_3 & A_4 & \cdots & A_Z \\ B_1 & B_2 & B_3 & B_4 & \cdots & B_Z \\ C_1 & C_2 & C_3 & C_4 & \cdots & C_Z \\ n_1 & n_2 & n_3 & n_4 & \cdots & n_Z \\ L & L & L & L & \cdots & L \end{bmatrix} \tag{39}$$

$$\text{Parameters} = \text{Parameters} + \frac{\sum \text{ParameterUpdate}}{\text{BufferSize}}$$

As described above, the unknown parameters are learned by hiding an observation of a variable and trying to predict it using the duct model. The error between the prediction and the observation drives an update. The example described immediately above is airflow-based learning in which the hidden observation is of total airflow, and the goal is to predict a value for the total airflow for a given set of zone damper positions and total pressure. Some other examples involve pressure-based learning in which the hidden observation may be of total pressure, and the goal may be to predict a value for the total pressure for a given set of zone damper positions and total airflow.

Figure 3:
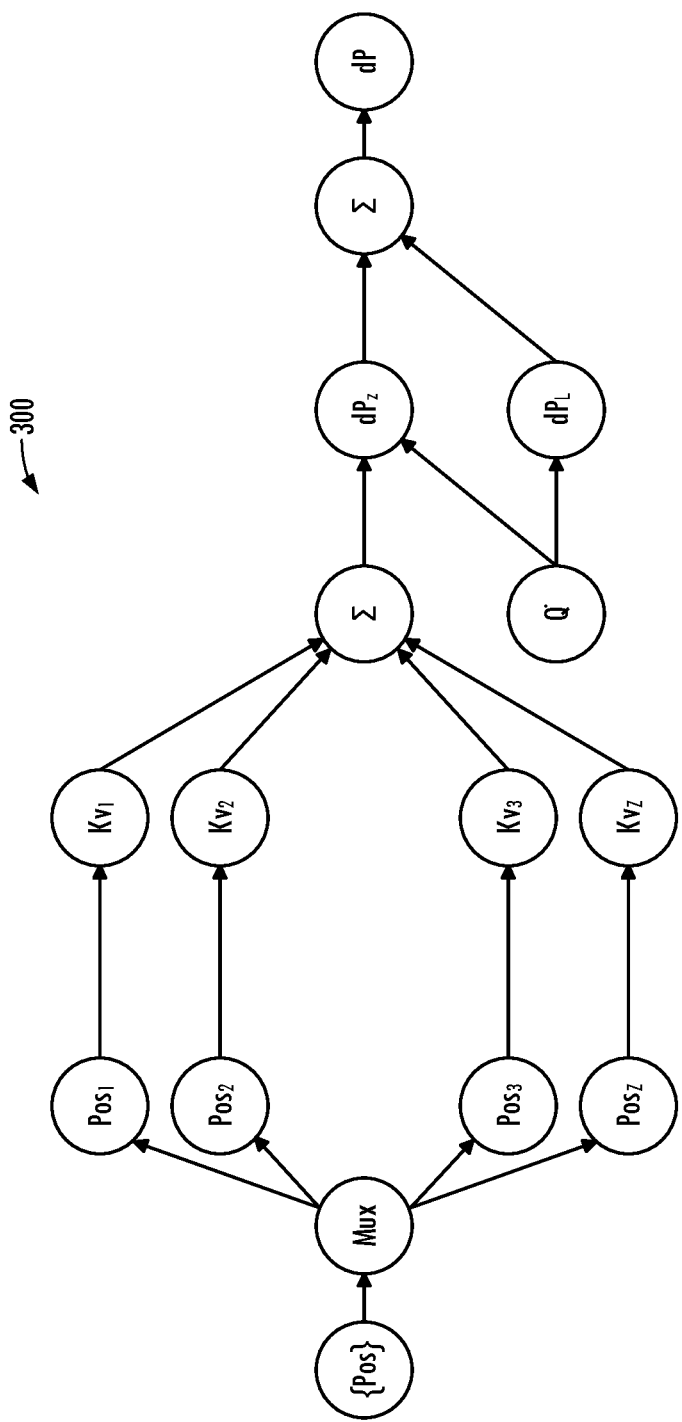
FIG. 3 illustrates a duct model for pressure-based learning, according to some example implementations.

FIG. 3 illustrates a duct model 300 for pressure-based learning, according to some example implementations. Similar to the duct model 200 for airflow-based learning, the duct model for pressure-based learning is structured like a neural network with custom activation functions that mimic a simplified physical model of the duct with zone dampers 112. In the forward path, the duct model takes a damper position set and total airflow as an input, and outputs a predicted total pressure.

In some examples, then, the regression analysis includes the control circuitry 118 configured to access, from the training data, a respective observation of the total airflow, a respective observation of the total pressure, and a respective damper position set. The control circuitry is configured to apply the respective observation of the total airflow and the respective damper position set, and the estimate of the unknown parameters, to the duct model to determine a predicted total pressure. The control circuitry is configured to determine an error between the predicted total pressure and the respective observation of the total pressure. And the control circuitry is configured to perform the regression analysis to update the estimates of the unknown parameters to the updated estimates of the unknown parameters that cause the predicted total pressure to be closer to the respective observation of the total pressure, and thereby reduce the error.

In some further examples, the control circuitry 118 is configured to determine estimates of the flow factor for the zone dampers 112 using the respective damper position set and the first term of the duct model that describes the flow factor. In some of these examples, the control circuitry is configured to determine the predicted total pressure using the respective observation of the total airflow, the estimates of the flow factor, the second term of the duct model restated to describe the branch pressure as a function of the total airflow and the flow factor for the zone dampers, and the third term of the duct model that describes the shared pressure.

Even more particularly, for example, the regression analysis may include the control circuitry 118 configured to execute the duct model, starting with the estimate of the unknown parameters. Similar to before, one example of a suitable estimate includes values of the unknown parameters that are the same across all of the zone dampers 112, and that are set as follows: A=1.00, B=8.00, C=0.50, n=1.5 and L=2.0. The control circuitry may access, from the training data, a respective observation of the total airflow $\dot{Q}$, a respective observation of the total pressure (expressed as a total pressure drop $dP_t$), and a respective damper position set $\{Pos_z\}$. The control circuitry may use this training data to predict the total pressure drop $dP_{Predicted}$, and update the values of the unknown parameters.

Following the total pressure expressed above in equation (4), the total pressure may be expressed as the sum of the shared pressure drop $dP_L$ and the branch pressure drop $\Delta P$:

$$dP_t = dP_L + dP \tag{40}$$

The branch pressure drop may be determined a function of the branch airflow (which is unknown), according to the second term of the duct model restated to describe the branch pressure as a function of the total airflow and the flow factor for the zone dampers:

$$dP = \left(\frac{\dot{Q}_z}{Kv_z}\right)^{n_z} \tag{41}$$

The shared pressure drop may be determined using the respective observation of the total airflow $\dot{Q}$ and the parameter L, according to the third term of the duct model that describes the shared pressure:

$$dP_L = \left(\frac{\dot{Q}}{L}\right)^{1.5} \tag{42}$$

To perform the regression analysis, a function that predicts branch pressure drop using total airflow may be derived by first defining the branch airflow as a function of the branch pressure drop using the second term of the duct model:

$$\dot{Q}_z = Kv_z \times (dP)^{\frac{1}{n_z}} \tag{43}$$

The sum of all branch airflows is equal to the total airflow (which is known to the algorithm):

$$\dot{Q} = \dot{Q}_1 + \dot{Q}_2 + \ldots + \dot{Q}_z \tag{44}$$

This can be written as a sum of branch-to-total airflow ratios R:

$$R_z = \frac{\dot{Q}_z}{\dot{Q}} \tag{45}$$

$$\dot{Q} = R_1 \dot{Q} + R_2 \dot{Q} \ldots + R_Z \dot{Q} \tag{46}$$

In equation (46), $\Sigma R_z = 1$.

Substitute (44) then (43) into (45) yields:

$$R_z = \frac{Kv_z \times (dP)^{\frac{1}{n_z}}}{\sum \left(Kv_z \times (dP)^{\frac{1}{n_z}}\right)} \tag{47}$$

The term $$(dP)^{\frac{1}{n_z}}$$

may be factored out of the summation in equation (47), and removed from the expression on the assumption that the pressure drop across all branches are the same and that the values for $n_z$ are similar:

$$R_z = \frac{(Kv_z) \times (dP)^{\frac{1}{n_z}}}{\sum (Kv_z) \times (dP)^{\frac{1}{n_z}}} \rightarrow R_z = \frac{(Kv_z)}{\sum (Kv_z)} \tag{48}$$

Then, from equations (45) and (48), branch airflow may be expressed as follows:

$$\dot{Q}_z = \dot{Q} \times \frac{(Kv_z)}{\sum (Kv_z)} \tag{49}$$

The expression of branch airflow in equation (49) may be substituted into equation (41) to get the branch pressure drop as a function of total airflow:

$$dP = \left(\frac{\dot{Q}}{\sum (Kv_z)}\right)^{n_z} \tag{50}$$

From equations (42) and (50), the total pressure drop given a total airflow value may be expressed as:

$$dP_t = \left(\frac{\dot{Q}}{L}\right)^{1.5} + \left(\frac{\dot{Q}}{\sum (Kv_z)}\right)^{n_z} \tag{51}$$

Similar to before, the control circuitry 118 may determine a predicted total pressure $dP_{Predicted}$ using equation (51), determine an error between the predicted total pressure and the respective observation of the total pressure, and use backpropagation-based regression to update the estimates of the unknown parameters.

The control circuitry 118 may determine the flow factor Kv along with its parameter A, B and C partial derivatives in a manner similar to airflow-based learning, expressed above in equations (21), (22) and (23). The partial derivatives of the total pressure with respect to Kv, L and n may be given as follows:

$$\frac{\partial dP_t}{\partial Kv_z} = -n_z \times (\dot{Q})^{n_z} \times \left(\sum Kv\right)^{-n_z - 1} \tag{52}$$

$$\frac{\partial dP_t}{\partial n_z} = \left(\frac{\dot{Q}}{\sum (Kv_z)}\right)^{n_z} \times \ln(n_z) \tag{53}$$

$$\frac{\partial dP_t}{\partial L} = -n(\dot{Q})^{n_z} \times L^{-n-1} \tag{54}$$

The squared difference between the predicted total pressure and the respective observation of the total pressure in the training data may be used as an error function for parameter regression to minimize:

$$\text{Error} = \frac{1}{2}(dP_{Predicted} - dP_t)^2 \tag{55}$$

The partial derivative of the error function with respect to the predicted total pressure may be:

$$\frac{\partial \text{Error}}{\partial dP_t} = dP_{Predicted} - dP_t \tag{56}$$

For the backpropagation and update, the partial derivatives of the error with respect to each parameter may be determined:

$$\frac{\partial \text{Error}}{\partial A_z} = \frac{\partial \text{Error}}{\partial dP_t} \times \frac{\partial dP_t}{\partial Kv_z} \times \frac{\partial Kv_z}{\partial A_z} \tag{57}$$

$$\frac{\partial \text{Error}}{\partial B_z} = \frac{\partial \text{Error}}{\partial dP_t} \times \frac{\partial dP_t}{\partial Kv_z} \times \frac{\partial Kv_Z}{\partial B_z} \tag{58}$$

-continued $$\frac{\partial \text{Error}}{\partial C_z} = \frac{\partial \text{Error}}{\partial dP_t} \times \frac{\partial dP_t}{\partial Kv_z} \times \frac{\partial Kv_z}{\partial C_z} \quad (59)$$

$$\frac{\partial \text{Error}}{\partial n_z} = \frac{\partial \text{Error}}{\partial dP_t} \times \frac{\partial dP_t}{\partial n_z} \quad (60)$$

$$\frac{\partial \text{Error}}{\partial L} = \frac{\partial \text{Error}}{\partial dP_t} \times \frac{\partial dP_t}{\partial L} \quad (61)$$

Similar to before, the terms may be evaluated for each state vector in the training data, and the estimates may then be updated from the gradients, such as according to a stochastic gradient descent like AdaMax.

Figure 4:
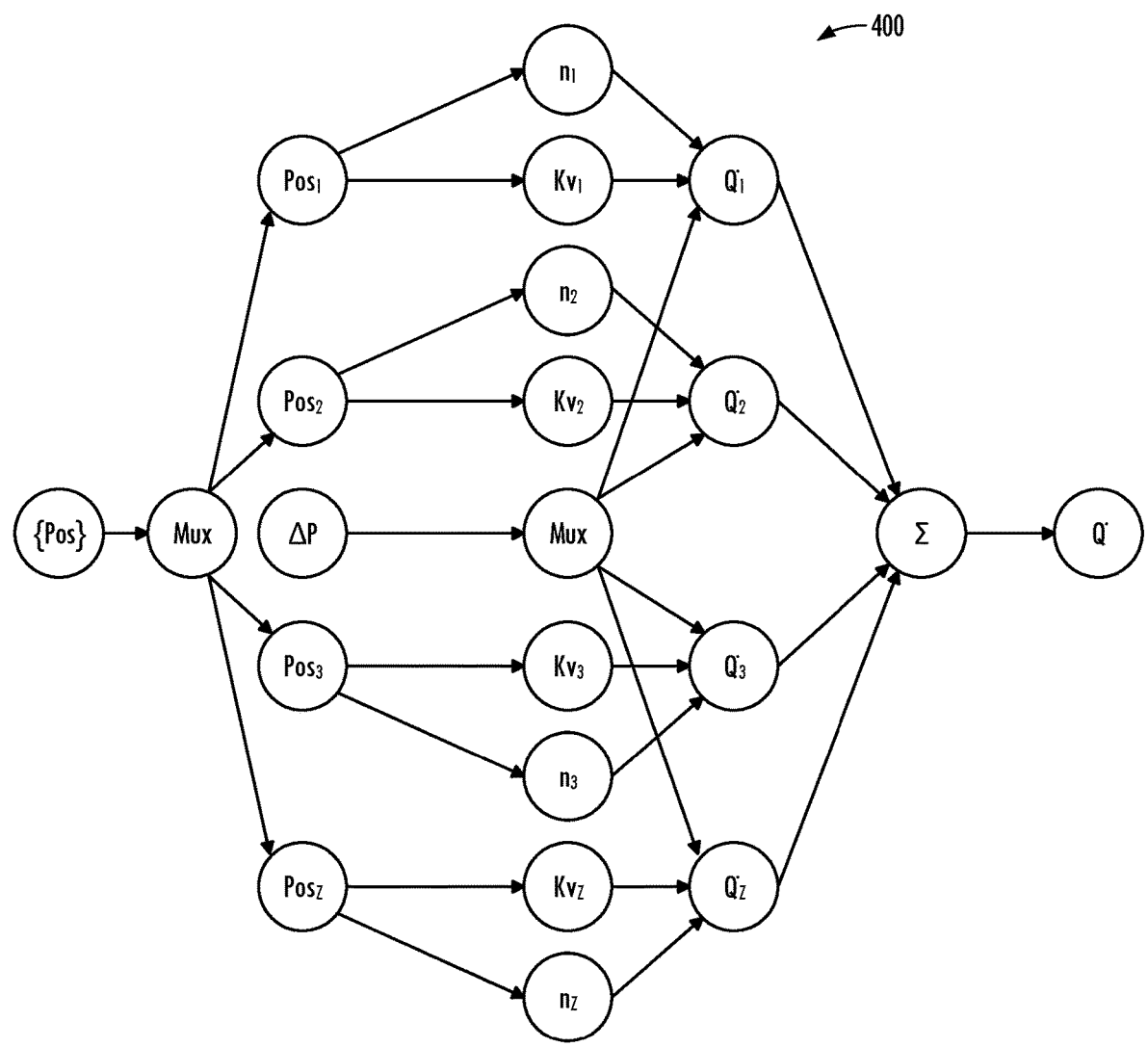
FIGS. 4, 5, 6, 7 and 8 illustrate other duct models according to some example implementations.

FIGS. 4, 5, 6, 7 and 8 illustrate other duct models according to some example implementations. FIG. 4 illustrates a duct model 400 including a static flow factor and exponent map with a learned area term, according to some examples. The model in this form does not include shared airflow path terms, and the only learned parameters are the equivalent damper areas. This form may be particularly useful when the measured pressure is the supply pressure, and the type of zone damper 112 is the same for all zones. The correlation between airflow through a zone damper and the measured pressure may be expressed as follows:

$$\dot{Q}_z = A_z \times Kv_z \times (\Delta P)^{\frac{1}{n_z}} \quad (62)$$

where $A_z$ is the damper area, learned in real time.

The flow factor and the exponent may be expressed as functions of zone damper positions. The functions may be fitted ahead of time, and their parameters may remain fixed during real time learning. The following is one example of flow factor and exponent functions:

$$n_Z = 1 + \frac{1}{1 + \exp(-a_1 \times (Pos_Z - a_2))} \quad (63)$$

$$Kv_Z = \frac{b_1}{1 + \exp(-b_2 \times (Pos_Z - b_3))} \quad (64)$$

In another example, the flow factor and exponent functions may be expressed as follows:

$$n_Z = a_1 \times \text{Position}_z + a_2 \quad (65)$$

$$Kv_z = b_1 \times \exp(-b_2 \times (Pos_Z - b_3)) \quad (66)$$

Figure 5:
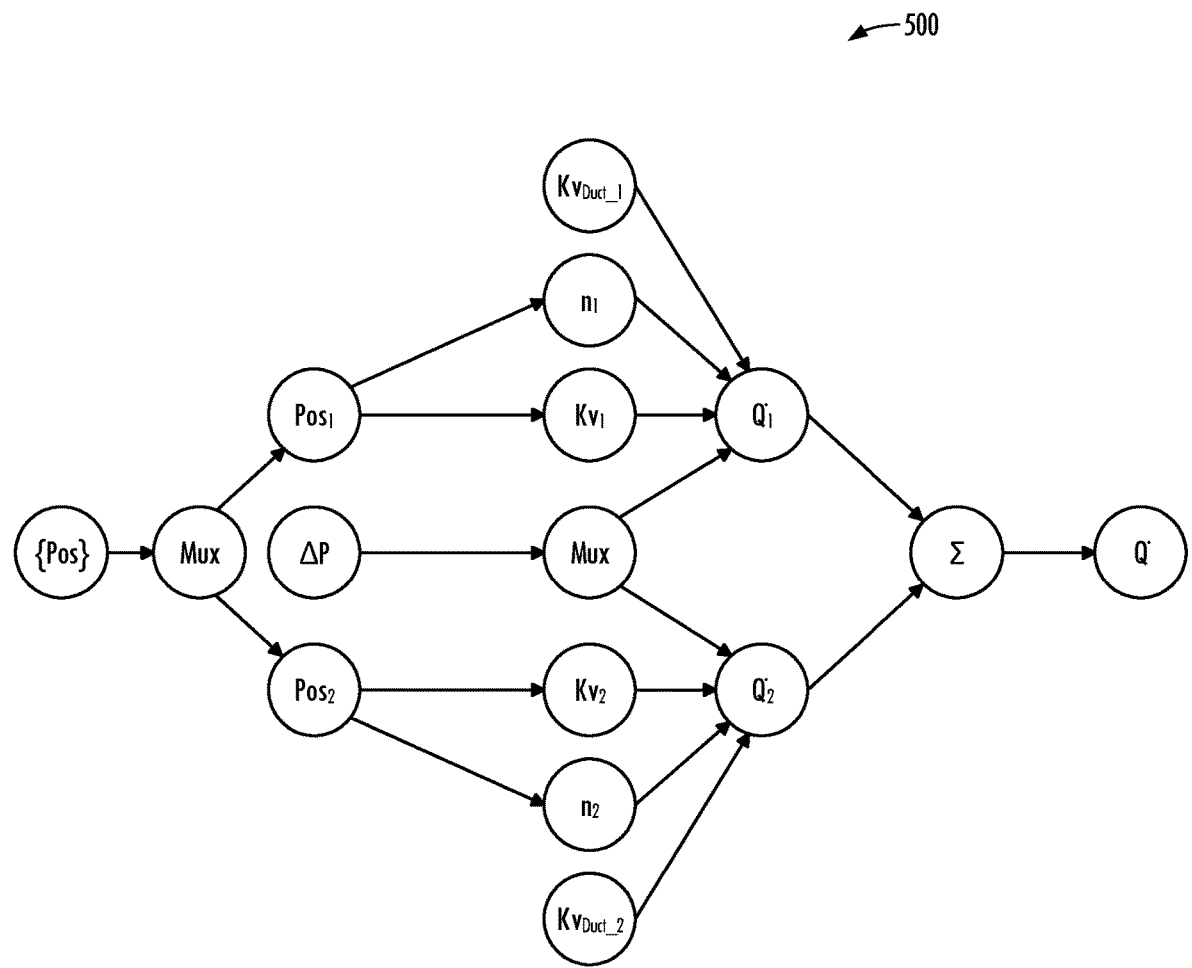

FIG. 5 illustrates a duct model 500 similar to duct model 400, but with an added term for an additional local pressure drop from a learned airflow coefficient term $Kv_{Duct}$:

$$Q_z = \left( \frac{\Delta P}{\left(\frac{1}{A_z \times Kv_z}\right)^{n_z} + \left(\frac{1}{Kv_{Duct\_z}}\right)^{n_z}} \right)^{\frac{1}{n_z}} \quad (67)$$

The duct model 500 is shown for two zone dampers 112, although it should be understood that the duct model is equally applicable for Z zone dampers as described above.

Figure 6:
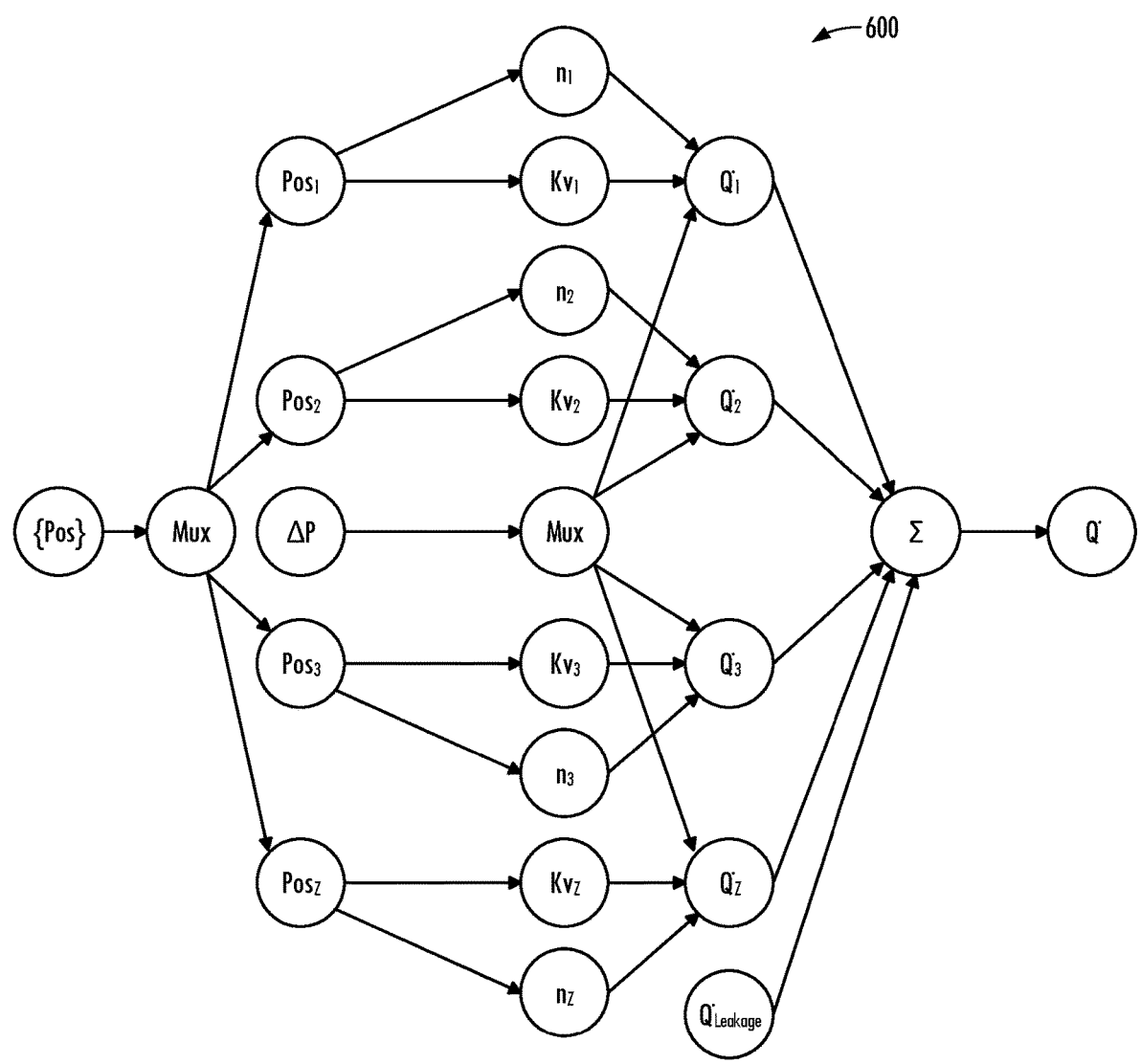

FIG. 6 illustrates another duct model 600 in which an always-open branch is added to the duct model 400 to account for duct leakage. The airflow $\dot{Q}_{Leakage}$ through that branch may also have an effect on the total pressure drop measured for a given set of total airflow and set of damper positions:

$$\dot{Q}_z = A_z \times Kv_Z \times (\Delta P)^{\frac{1}{n_z}} \quad (68)$$

$$\dot{Q}_{Leakage} = Kv_{Leakage}(\Delta P)^{\frac{1}{n}} \quad (69)$$

$$\dot{Q}_{total} = \dot{Q}_{Leakage} + \sum_Z \dot{Q}_z \quad (70)$$

Figure 7:
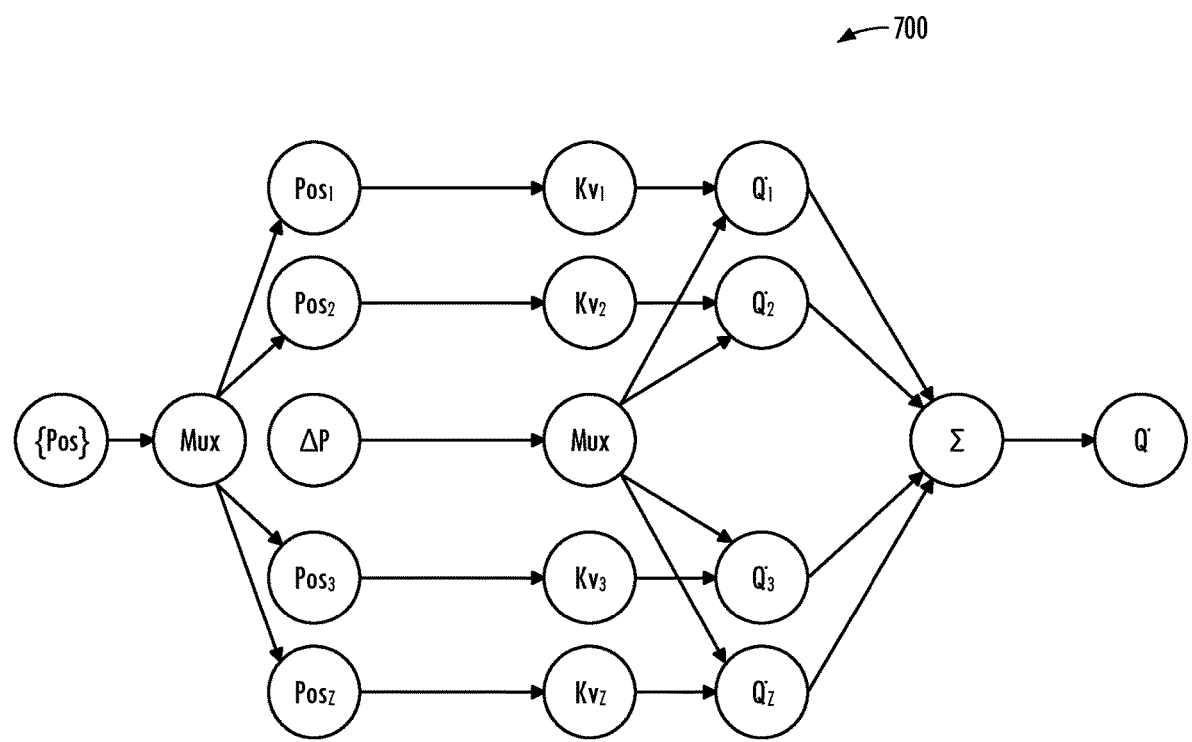

FIG. 7 illustrates a duct model 700 that adds additional learned parameters into the flow coefficient map, which allows the duct model to combine the additional duct $Kv_{Duct}$ term with the zone damper flow factor Kv. It may also allow learning a single value for $n_z$, and remove learning a damper area. The following are two examples of an airflow coefficient map function (parameters in the function learned):

$$Kv = A \times \left(1 - \cos\left(B \times Pos \times \frac{\pi}{2}\right)\right) \quad (71)$$

$$Kv = \frac{A}{(1 + \exp(-B \times (Pos - C)))} \quad (72)$$

From the airflow coefficient map function, the branch airflow as a function pressure becomes:

$$\dot{Q}_z = Kv_z \times (\Delta P)^{\frac{1}{n_z}} \quad (73)$$

Figure 8:
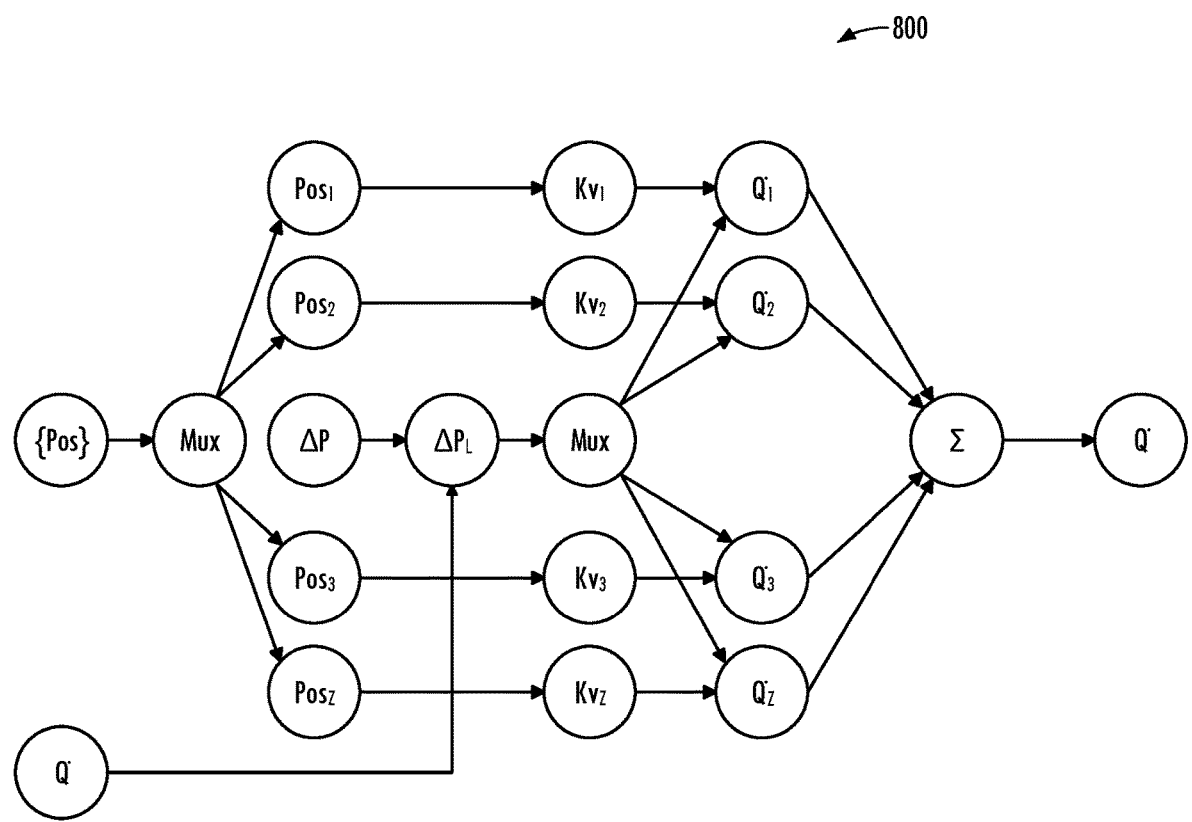

FIG. 8 shows a duct model 800 that uses total pressure instead of supply pressure, which results in the addition of a pressure drop term across a shared airflow path to the duct model. The pressure drop through the shared path may be a function of the total airflow, and the addition of it as an input to the model may be one way to resolve the shared pressure drop term:

$$\Delta P_L = \left(\frac{\dot{Q}}{L}\right)^{1.5} \quad (74)$$

$$\Delta P_z = \Delta P_t - \Delta P_L \quad (75)$$

$$\dot{Q}_z = Kv_z \times (\Delta P_z)^{\frac{1}{n_z}} \quad (76)$$

Another way to resolve the shared pressure drop term without requiring an additional total airflow input is to use a recursion, as described above with respect to the duct model 200 in FIG. 2.

FIGS. 9A, 9B, 9C, 9D, 9E, 9F, 9G and 9H are flowcharts illustrating various operations in a method 900 of controlling an HVAC system 100, according to some example implementations. Again, the HVAC system includes HVAC equipment 102 with a fan 104 such as an indoor fan configured to provide conditioned air to a conditioned space 106 that is divided into zones 106A, 106B, 106C. The HVAC system is set up in an installation with ductwork 108, 110, 114, 116 that defines an air circulation path, and zone dampers 112 controllable to regulate airflow of the conditioned air to respective ones of the zones. As shown at block 902 of FIG. 9A, the method includes receiving an indication of zone airflow target values for the zones of the conditioned space.

The method 900 includes accessing a duct model including a first term that describes a flow factor for a zone damper as a nonlinear function of damper position, and a second term that describes zone airflow as a function of the flow factor and a branch pressure across zone-specific branches of the air circulation path, as shown at block 904. The method includes applying the zone airflow target values to the duct model to determine a damper position set, and actuating the zone dampers to respective damper positions of the damper position set, as shown at blocks 906 and 908. In some examples, the zone airflow target values are applied to the duct model at block 906 to further determine a value of total airflow to achieve the zone airflow target values with a total pressure target, and the method 900 further includes causing the fan to provide the conditioned air with the value of the total airflow, as shown at block 910.

In some examples, the duct model includes unknown parameters. In some of these examples, the method 900 further includes determining values of the unknown parameters that are specific to the installation, and fitting the duct model with the values of the unknown parameters, as shown at blocks 912 and 914 of FIG. 9B. In some further examples, determining the values of the unknown parameters at block 912 includes receiving an indication of zone sizes, each of the zone sizes expressed as a maximum zone airflow for the zone with the zone damper in a fully-open position, and determining the values of the unknown parameters using the duct model and the zone sizes, as shown at blocks 916 and 918 of FIG. 9C.

In some examples, the duct model further includes a third term that describes a shared pressure across a shared portion of the air circulation path as a function of total airflow. In some of these examples, determining the values of the unknown parameters at block 912 includes obtaining training data that includes observations of the total airflow, observations of total pressure, and damper position sets, as shown at block 920 of FIG. 9D. Also in some of these examples, the total pressure is a sum total of the branch pressure and the shared pressure. A regression analysis of the duct model is performed using the training data and an estimate of the unknown parameters to determine updated estimates of the unknown parameters, as shown at block 922. And the values of the unknown parameters are determined from the updated estimates of the unknown parameters, as shown at block 924.

In some further examples, obtaining the training data at block 920 includes obtaining state vectors that represent states of the installation, and that include respective ones of the observations of the total airflow, the observations of the total pressure, and the damper position sets, as shown at block 926. The state vectors are selected or rejected based on acceptability of the states and variation across the states of the installation, as shown at block 928. The acceptability of a state determined based on at least a metric that characterizes the state as steady-state or transient based on a respective state vector, and the state is acceptable when the state is at least characterized as steady-state. The observations of the total airflow, the observations of the total pressure, and the damper position sets are added for those of the state vectors that are selected to the training data, as shown at block 930.

Figure 9A:
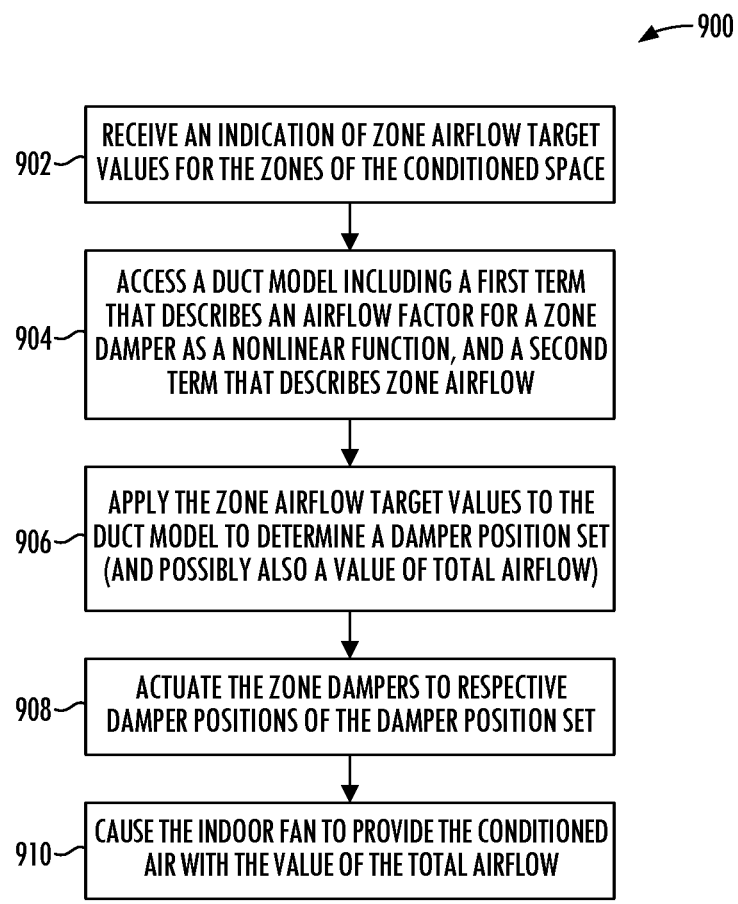
Figure 9B:
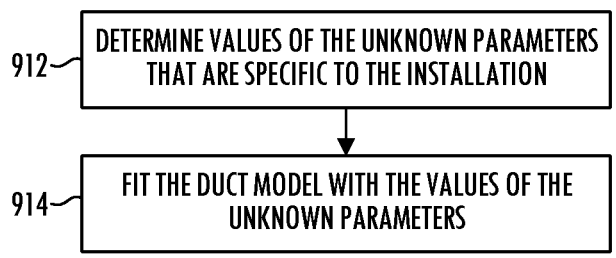
Figure 9C:
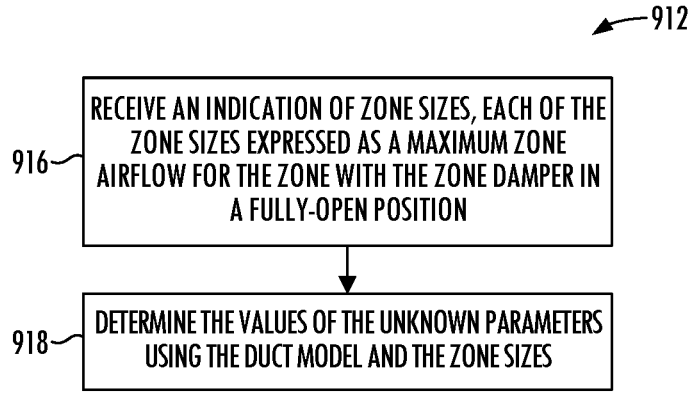
Figure 9D:
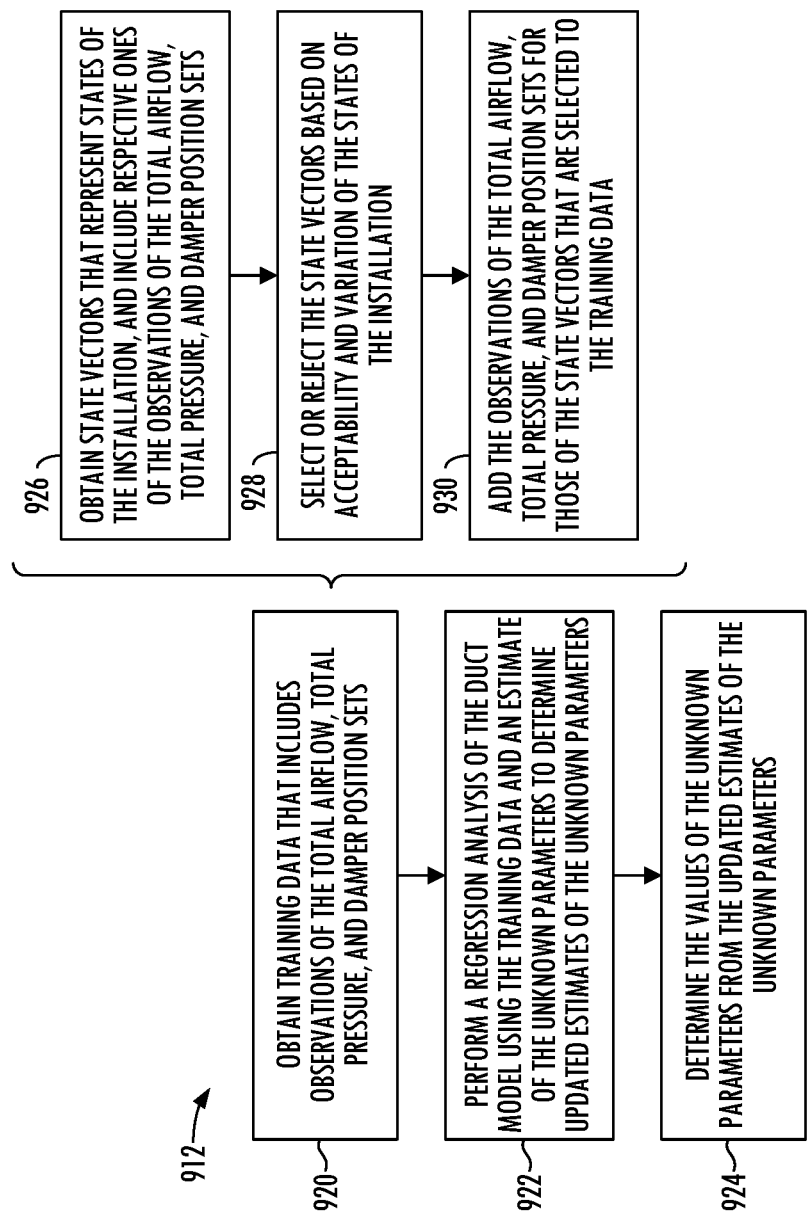
Figure 9E:
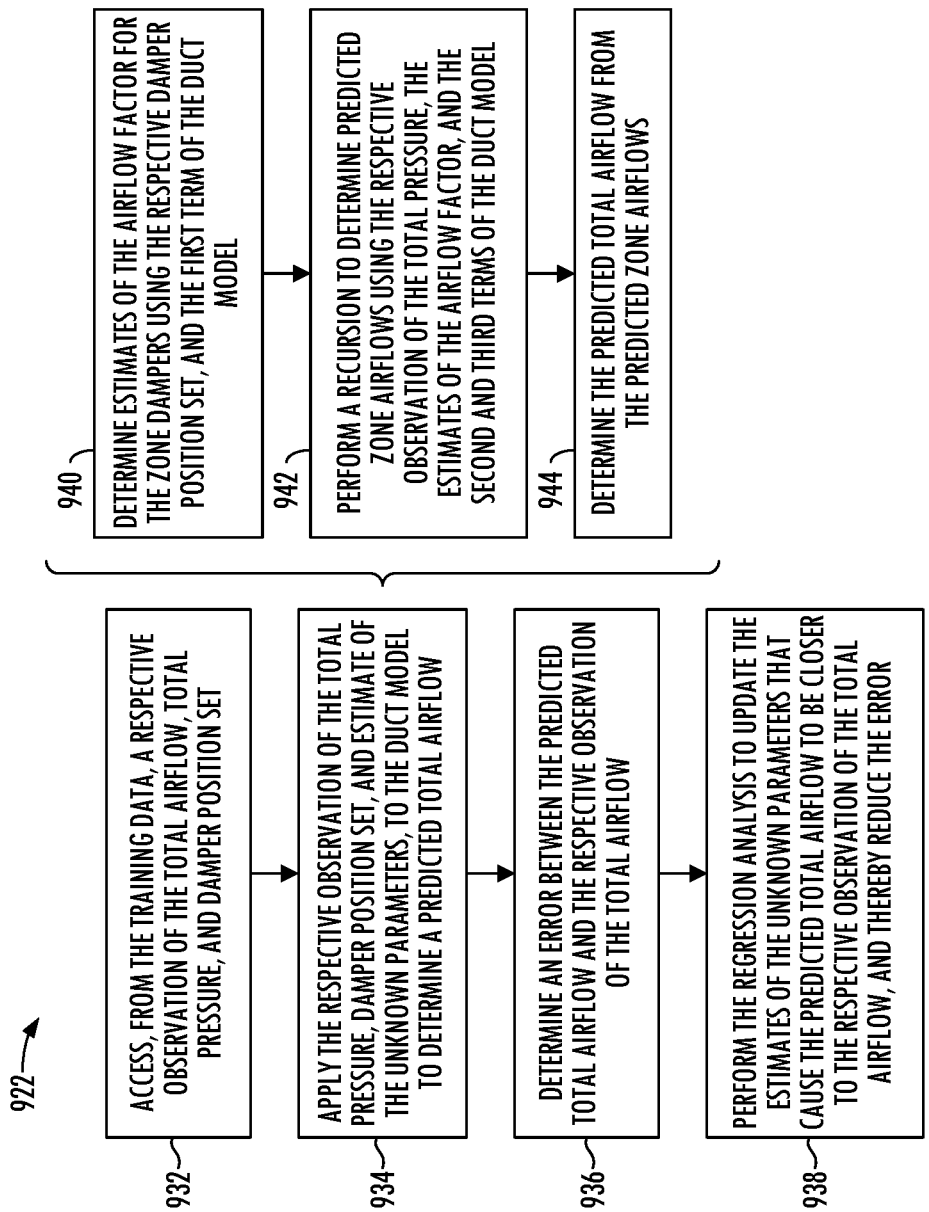

In some examples, performing the regression analysis at block 922 includes accessing, from the training data, a respective observation of the total airflow, a respective observation of the total pressure, and a respective damper position set, as shown at block 932 of FIG. 9E. In some of these examples, the regression analysis also includes applying the respective observation of the total pressure, the respective damper position set, and the estimate of the unknown parameters, to the duct model to determine a predicted total airflow, as shown at block 934. An error between the predicted total airflow and the respective observation of the total airflow is determined, as shown at block 936. And the regression analysis is performed to update the estimates of the unknown parameters to the updated estimates of the unknown parameters that cause the predicted total airflow to be closer to the respective observation of the total airflow, and thereby reduce the error, as shown at block 938.

In some further examples, applying the respective observation of the total pressure, the respective damper position set, and the estimate of the unknown parameters, to the duct model to determine the predicted total airflow at block 934 includes determining estimates of the flow factor for the zone dampers using the respective damper position set, and the first term of the duct model that describes the flow factor, as shown at block 940. A recursion is performed to determine predicted zone airflows using the respective observation of the total pressure, the estimates of the flow factor, the second term of the duct model that describes the zone airflow, and the third term of the duct model that describes the shared pressure, as shown at block 942. And the predicted total airflow is determined from the predicted zone airflows, as shown at block 944.

Figure 9G:
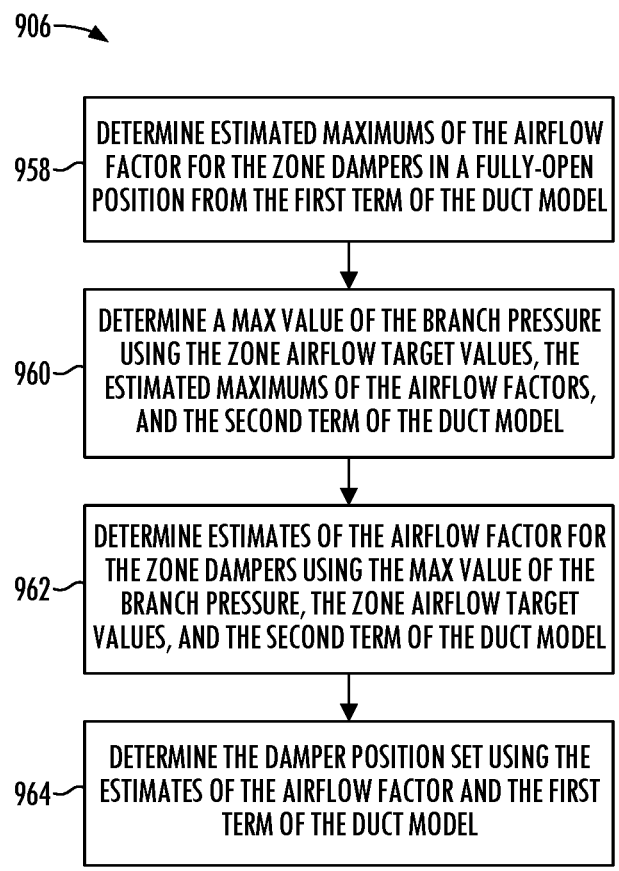
Figure 9H:
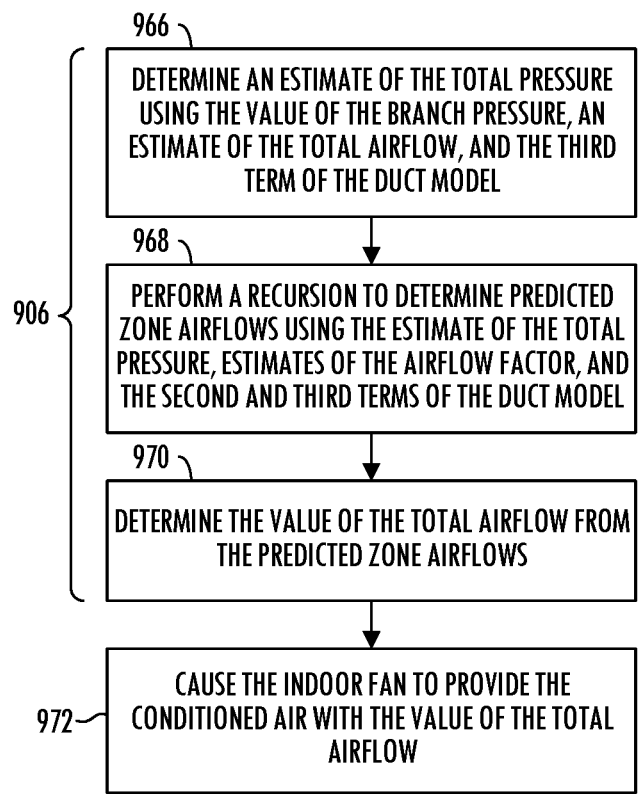

In some examples, performing the regression analysis at block 922 includes accessing, from the training data, a respective observation of the total airflow, a respective observation of the total pressure, and a respective damper position set, as shown at block 946 of FIG. 9H. In some of these examples, the regression analysis also includes applying the respective observation of the total airflow and the respective damper position set, and the estimate of the unknown parameters, to the duct model to determine a predicted total pressure, as shown at block 948. An error between the predicted total pressure and the respective observation of the total pressure is determined, as show at block 950. And the regression analysis is performed to update the estimates of the unknown parameters to the updated estimates of the unknown parameters that cause the predicted total pressure to be closer to the respective observation of the total pressure, and thereby reduce the error, as shown at block 952.

In some further examples, applying the respective observation of the total airflow and the respective damper position set, and the estimate of the unknown parameters, to the duct model to determine the predicted total pressure at block 948 includes determining estimates of the flow factor for the zone dampers using the respective damper position set and the first term of the duct model that describes the flow factor, as shown at block 954. The predicted total pressure is then determined using the respective observation of the total airflow, the estimates of the flow factor, the second term of the duct model restated to describe the branch pressure as a function of the total airflow and the flow factor for the zone dampers, and the third term of the duct model that describes the shared pressure, as shown at block 956.

In some examples, applying the zone airflow target values to the duct model to determine the damper position set at block 906 includes determining estimated maximums of the flow factor for the zone dampers in a fully-open position from the first term of the duct model that describes the flow factor, as shown at block 958 of FIG. 9G. A maximum value of the branch pressure is determined using the zone airflow target values, the estimated maximums of the flow factor, and the second term of the duct model restated to describe the branch pressure as a function of the zone airflow and the flow factor, as shown at block 960. Estimates of the flow factor for the zone dampers are determined using the maximum value of the branch pressure, the zone airflow target values, and the second term of the duct model restated to describe the flow factor as a function of the zone airflow and the branch pressure, as shown at block 962. And the damper position set is determined using the estimates of the flow factor and the first term of the duct model restated to describe the damper position as a nonlinear function of the flow factor, as shown at block 964.

In some further examples in which the duct model further includes the third term that describes the shared pressure across the shared portion of the air circulation path as a function of total airflow, the zone airflow target values are applied to the duct model at block 906 to further determine a value of the total airflow to achieve the zone airflow target values with a branch pressure target. In some of these examples, applying the zone airflow target values to the duct model to determine the value of the total airflow includes determining an estimate of the total pressure using the maximum value of the branch pressure, an estimate of the total airflow as a sum total of the zone airflow target values, and the third term that describes the shared pressure, as shown at block 966 of FIG. 9H. A recursion is performed to determine predicted zone airflows using the estimate of the total pressure, the estimates of the flow factor, the second term of the duct model that describes the zone airflow, and the third term of the duct model that describes the shared pressure, as shown at block 968. The value of the total airflow is determined from the predicted zone airflows, as shown at block 970. And the method 900 further incudes causing the fan to provide the conditioned air with the value of the total airflow, as shown at block 972.

According to example implementations of the present disclosure, the control circuitry 118 may be implemented by various means. Means for implementing the control circuitry may include hardware, alone or under direction of one or more computer programs from a computer-readable storage medium. In some examples, the control circuitry is formed of one or more circuit boards. The control circuitry may be centrally located or distributed throughout the HVAC system 100. For example, the control circuitry may be formed of distinct circuit boards including a circuit board positioned in the thermostat 122, and one or more circuit boards positioned at or within the HVAC equipment 102 (e.g., at the fan 104 configured to circulate or otherwise provide the conditioned air to the conditioned space 106).

Figure 10:
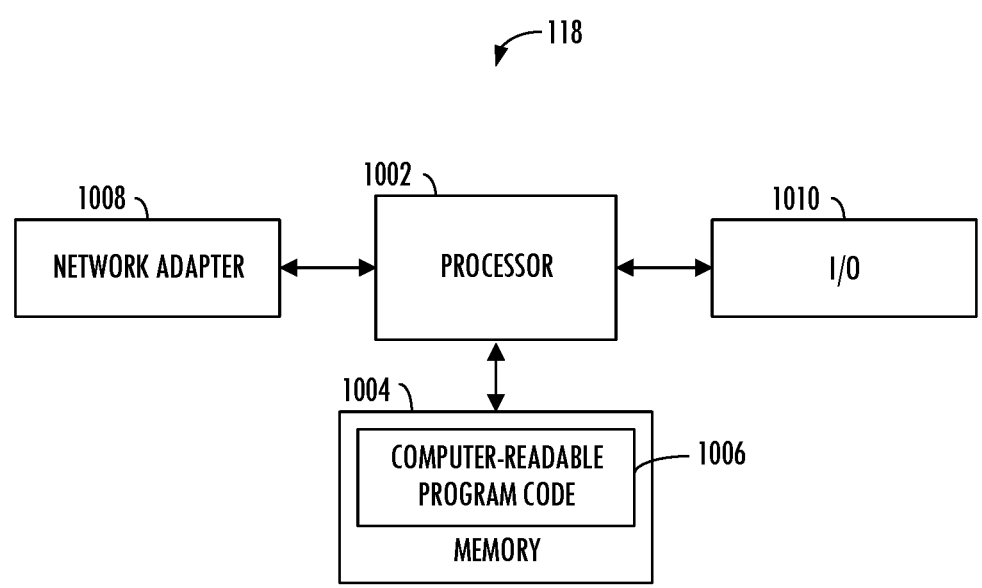
FIG. 10 illustrates control circuitry according to some example implementations.

FIG. 10 illustrates the control circuitry 118 according to some example implementations of the present disclosure. The control circuitry may include one or more of each of a number of components such as, for example, a processor 1002 connected to a memory 1004. The processor is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor 1002 may be a number of processors, a multi-core processor or some other type of processor, depending on the particular implementation.

The processor 1002 may be configured to execute computer programs such as computer-readable program code 1006, which may be stored onboard the processor or otherwise stored in the memory 1004. In some examples, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 1004 is generally any piece of computer hardware capable of storing information such as, for example, data, computer-readable program code 1006 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 1002, causes the control circuitry 118 to perform various operations as described herein, some of which may in turn cause the HVAC system 100 to perform various operations.

In addition to the memory 1004, the processor 1002 may also be connected to one or more peripherals such as a network adapter 1008, one or more input/output (I/O) devices 1010 or the like. The network adapter is a hardware component configured to connect the control circuitry 118 to a computer network to enable the control circuitry to transmit and/or receive information via the computer network. The I/O devices may include one or more input devices capable of receiving data or instructions for the control circuitry, and/or one or more output devices capable of providing an output from the control circuitry. Examples of suitable input devices include a keyboard, keypad or the like, and examples of suitable output devices include a display device such as a one or more light-emitting diodes (LEDs), a LED display, a liquid crystal display (LCD), or the like.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A heating, ventilation, and air conditioning (HVAC) system comprising:

HVAC equipment with a fan configured to provide conditioned air to a conditioned space that is divided into zones, and that is set up in an installation with ductwork that defines an air circulation path, and zone dampers controllable to regulate airflow of the conditioned air to respective ones of the zones; and control circuitry operably coupled to the HVAC equipment and configured to at least:

receive an indication of zone airflow target values for the zones of the conditioned space;

access a duct model including a first term that describes a flow factor for a zone damper as a nonlinear function of damper position, a second term that describes zone airflow as a function of the flow factor and a branch pressure across zone-specific branches of the air circulation path, and at least one or more unknown parameters that are specific to the installation and are determined using a backpropagation-based regression analysis of training data and an estimate of the unknown parameters;

apply the zone airflow target values to the duct model to determine a damper position set; and actuate the zone dampers to respective damper positions of the damper position set.

2. The HVAC system of claim 1, wherein the control circuitry is configured to apply the zone airflow target values to the duct model to further determine a value of total airflow to achieve the zone airflow target values with a total pressure target, and wherein the control circuitry is further configured to cause the fan to provide the conditioned air with the value of the total airflow.

3. The HVAC system of claim 1, wherein the control circuitry is further configured to at least:

determine values of the unknown parameters that are specific to the installation; and fit the duct model with the values of the unknown parameters.

4. The HVAC system of claim 3, wherein the control circuitry configured to determine the values of the unknown parameters includes the control is configured to at least:

receive an indication of zone sizes, each of the zone sizes expressed as a maximum zone airflow for the zone with the zone damper in a fully-open position; and determine the values of the unknown parameters using the duct model and the zone sizes.

5. The HVAC system of claim 3, wherein the duct model further includes a third term that describes a shared pressure across a shared portion of the air circulation path as a function of total airflow, and the control circuitry configured to determine the values of the unknown parameters includes the control circuitry configured to at least:

obtain training data that includes observations of the total airflow, observations of total pressure, and damper position sets, wherein the total pressure is a sum total of the branch pressure and the shared pressure;

perform a regression analysis of the duct model using the training data and an estimate of the unknown parameters to determine updated estimates of the unknown parameters; and determine the values of the unknown parameters from the updated estimates of the unknown parameters.

6. The HVAC system of claim 5, wherein the control circuitry configured to obtain the training data includes the control circuitry configured to at least:

obtain state vectors that represent states of the installation, and that include respective ones of the observations of the total airflow, the observations of the total pressure, and the damper position sets;

select or reject the state vectors based on acceptability of the states and variation across the states of the installation, the acceptability of a state determined based on at least a metric that characterizes the state as steady-state or transient based on a respective state vector, the state being acceptable when the state is at least characterized as steady-state; and add the observations of the total airflow, the observations of the total pressure, and the damper position sets for those of the state vectors that are selected to the training data.

7. The HVAC system of claim 5, wherein the control circuitry configured to perform the regression analysis includes the control circuitry configured to at least:

access, from the training data, a respective observation of the total airflow, a respective observation of the total pressure, and a respective damper position set;

apply the respective observation of the total pressure, the respective damper position set, and the estimate of the unknown parameters, to the duct model to determine a predicted total airflow;

determine an error between the predicted total airflow and the respective observation of the total airflow; and perform the regression analysis to update the estimates of the unknown parameters to the updated estimates of the unknown parameters that cause the predicted total airflow to be closer to the respective observation of the total airflow, and thereby reduce the error.

8. The HVAC system of claim 7, wherein the control circuitry configured to apply the respective observation of the total pressure, the respective damper position set, and the estimate of the unknown parameters, to the duct model to determine the predicted total airflow includes the control circuitry configured to at least:

determine estimates of the flow factor for the zone dampers using the respective damper position set, and the first term of the duct model that describes the flow factor;

perform a recursion to determine predicted zone airflows using the respective observation of the total pressure, the estimates of the flow factor, the second term of the duct model that describes the zone airflow, and the third term of the duct model that describes the shared pressure; and determine the predicted total airflow from the predicted zone airflows.

9. The HVAC system of claim 5, wherein the control circuitry configured to perform the regression analysis includes the control circuitry configured to at least:

access, from the training data, a respective observation of the total airflow, a respective observation of the total pressure, and a respective damper position set;

apply the respective observation of the total airflow and the respective damper position set, and the estimate of the unknown parameters, to the duct model to determine a predicted total pressure;

determine an error between the predicted total pressure and the respective observation of the total pressure; and perform the regression analysis to update the estimates of the unknown parameters to the updated estimates of the unknown parameters that cause the predicted total pressure to be closer to the respective observation of the total pressure, and thereby reduce the error.

10. The HVAC system of claim 9, wherein the control circuitry configured to apply the respective observation of the total airflow and the respective damper position set, and the estimate of the unknown parameters, to the duct model to determine the predicted total pressure includes the control circuitry configured to at least:

determine estimates of the flow factor for the zone dampers using the respective damper position set and the first term of the duct model that describes the flow factor; and determine the predicted total pressure using the respective observation of the total airflow, the estimates of the flow factor, the second term of the duct model restated to describe the branch pressure as a function of the total airflow and the flow factor for the zone dampers, and the third term of the duct model that describes the shared pressure.

11. The HVAC system of claim 1, wherein the control circuitry configured to apply the zone airflow target values to the duct model to determine the damper position set includes the control circuitry configured to at least:

determine estimated maximums of the flow factor for the zone dampers in a fully-open position from the first term of the duct model that describes the flow factor;

determine a maximum value of the branch pressure using the zone airflow target values, the estimated maximums of the flow factor, and the second term of the duct model restated to describe the branch pressure as a function of the zone airflow and the flow factor;

determine estimates of the flow factor for the zone dampers using the maximum value of the branch pressure, the zone airflow target values, and the second term of the duct model restated to describe the flow factor as a function of the zone airflow and the branch pressure; and determine the damper position set using the estimates of the flow factor and the first term of the duct model restated to describe the damper position as a nonlinear function of the flow factor.

12. The HVAC system of claim 11, wherein the duct model further includes a third term that describes a shared pressure across a shared portion of the air circulation path as a function of total airflow, the zone airflow target values are applied to the duct model to further determine a value of the total airflow to achieve the zone airflow target values with a branch pressure target, and the control circuitry configured to apply the zone airflow target values to the duct model to determine the value of the total airflow includes the control circuitry configured to at least:

determine an estimate of the total pressure using the maximum value of the branch pressure, an estimate of the total airflow as a sum total of the zone airflow target values, and the third term that describes the shared pressure;

perform a recursion to determine predicted zone airflows using the estimate of the total pressure, the estimates of the flow factor, the second term of the duct model that describes the zone airflow, and the third term of the duct model that describes the shared pressure; and determine the value of the total airflow from the predicted zone airflows, and wherein the control circuitry is further configured to cause the fan to provide the conditioned air with the value of the total airflow.

13. A method of controlling a heating, ventilation, and air conditioning (HVAC) system that includes HVAC equipment with a fan configured to provide conditioned air to a conditioned space that is divided into zones, and that is set up in an installation with ductwork that defines an air circulation path, and zone dampers controllable to regulate airflow of the conditioned air to respective ones of the zones, the method comprising:

receiving an indication of zone airflow target values for the zones of the conditioned space;

accessing a duct model including a first term that describes a flow factor for a zone damper as a nonlinear function of damper position, and a second term that describes zone airflow as a function of the flow factor, a branch pressure across zone-specific branches of the air circulation path, and at least one or more unknown parameters that are specific to the installation and are determined using a backpropagation-based regression analysis of training data and an estimate of the unknown parameters;

applying the zone airflow target values to the duct model to determine a damper position set; and actuating the zone dampers to respective damper positions of the damper position set.

14. The method of claim 13, wherein the zone airflow target values are applied to the duct model to further determine a value of total airflow to achieve the zone airflow target values with a total pressure target, and wherein the method further comprises causing the fan to provide the conditioned air with the value of the total airflow.

15. The method of claim 13, wherein the method further comprises:

determining values of the unknown parameters that are specific to the installation; and fitting the duct model with the values of the unknown parameters.

16. The method of claim 15, wherein determining the values of the unknown parameters comprises:

receiving an indication of zone sizes, each of the zone sizes expressed as a maximum zone airflow for the zone with the zone damper in a fully-open position; and determining the values of the unknown parameters using the duct model and the zone sizes.

17. The method of claim 15, wherein the duct model further includes a third term that describes a shared pressure across a shared portion of the air circulation path as a function of total airflow, and determining the values of the unknown parameters comprises:

obtaining training data that includes observations of the total airflow, observations of total pressure, and damper position sets, wherein the total pressure is a sum total of the branch pressure and the shared pressure;

performing a regression analysis of the duct model using the training data and an estimate of the unknown parameters to determine updated estimates of the unknown parameters; and determining the values of the unknown parameters from the updated estimates of the unknown parameters.

18. The method of claim 17, wherein obtaining the training data comprises:

obtaining state vectors that represent states of the installation, and that include respective ones of the observations of the total airflow, the observations of the total pressure, and the damper position sets;

selecting or rejecting the state vectors based on acceptability of the states and variation across the states of the installation, the acceptability of a state determined based on at least a metric that characterizes the state as steady-state or transient based on a respective state vector, the state being acceptable when the state is at least characterized as steady-state; and adding the observations of the total airflow, the observations of the total pressure, and the damper position sets for those of the state vectors that are selected to the training data.

19. The method of claim 17, wherein performing the regression analysis comprises:
   accessing, from the training data, a respective observation of the total airflow, a respective observation of the total pressure, and a respective damper position set;
   applying the respective observation of the total pressure, the respective damper position set, and the estimate of the unknown parameters, to the duct model to determine a predicted total airflow;
   determining an error between the predicted total airflow and the respective observation of the total airflow; and
   performing the regression analysis to update the estimates of the unknown parameters to the updated estimates of the unknown parameters that cause the predicted total airflow to be closer to the respective observation of the total airflow, and thereby reduce the error.

20. The method of claim 19, wherein applying the respective observation of the total pressure, the respective damper position set, and the estimate of the unknown parameters, to the duct model to determine the predicted total airflow comprises:
   determining estimates of the flow factor for the zone dampers using the respective damper position set, and the first term of the duct model that describes the flow factor;
   performing a recursion to determine predicted zone airflows using the respective observation of the total pressure, the estimates of the flow factor, the second term of the duct model that describes the zone airflow, and the third term of the duct model that describes the shared pressure; and
   determining the predicted total airflow from the predicted zone airflows.

21. The method of claim 17, wherein performing the regression analysis comprises:
   accessing, from the training data, a respective observation of the total airflow, a respective observation of the total pressure, and a respective damper position set;
   applying the respective observation of the total airflow and the respective damper position set, and the estimate of the unknown parameters, to the duct model to determine a predicted total pressure;
   determining an error between the predicted total pressure and the respective observation of the total pressure; and
   performing the regression analysis to update the estimates of the unknown parameters to the updated estimates of the unknown parameters that cause the predicted total pressure to be closer to the respective observation of the total pressure, and thereby reduce the error.

22. The method of claim 21, wherein applying the respective observation of the total airflow and the respective damper position set, and the estimate of the unknown parameters, to the duct model to determine the predicted total pressure comprises:
   determining estimates of the flow factor for the zone dampers using the respective damper position set and the first term of the duct model that describes the flow factor; and
   determining the predicted total pressure using the respective observation of the total airflow, the estimates of the flow factor, the second term of the duct model restated to describe the branch pressure as a function of the total airflow and the flow factor for the zone dampers, and the third term of the duct model that describes the shared pressure.

23. The method of claim 13, wherein applying the zone airflow target values to the duct model to determine the damper position set comprises:
   determining estimated maximums of the flow factor for the zone dampers in a fully-open position from the first term of the duct model that describes the flow factor;
   determining a maximum value of the branch pressure using the zone airflow target values, the estimated maximums of the flow factor, and the second term of the duct model restated to describe the branch pressure as a function of the zone airflow and the flow factor;
   determining estimates of the flow factor for the zone dampers using the maximum value of the branch pressure, the zone airflow target values, and the second term of the duct model restated to describe the flow factor as a function of the zone airflow and the branch pressure; and
   determining the damper position set using the estimates of the flow factor and the first term of the duct model restated to describe the damper position as a nonlinear function of the flow factor.

24. The method of claim 23, wherein the duct model further includes a third term that describes a shared pressure across a shared portion of the air circulation path as a function of total airflow, the zone airflow target values are applied to the duct model to further determine a value of the total airflow to achieve the zone airflow target values with a branch pressure target, and applying the zone airflow target values to the duct model to determine the value of the total airflow comprises:
   determining an estimate of the total pressure using the maximum value of the branch pressure, an estimate of the total airflow as a sum total of the zone airflow target values, and the third term that describes the shared pressure;
   performing a recursion to determine predicted zone airflows using the estimate of the total pressure, the estimates of the flow factor, the second term of the duct model that describes the zone airflow, and the third term of the duct model that describes the shared pressure; and
   determining the value of the total airflow from the predicted zone airflows, and wherein the method further comprises causing the fan to provide the conditioned air with the value of the total airflow.

* * * * *